(12) United States Patent
Beck et al.

(10) Patent No.: US 12,529,585 B2
(45) Date of Patent: Jan. 20, 2026

(54) THERMOPILE-BASED FLOW SENSING APPARATUS WITH ELECTROSTATIC PROTECTION

(71) Applicant: Honeywell International Inc., Charlotte, NC (US)

(72) Inventors: Scott Edward Beck, Charlotte, NC (US); Yong-Fa Alan Wang, Charlotte, NC (US); Yousef M. Alimi, Charlotte, NC (US); Thuy-Doan Pham, Charlotte, NC (US); Hongqiang Yan, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 308 days.

(21) Appl. No.: 18/198,225

(22) Filed: May 16, 2023

(65) Prior Publication Data
US 2024/0385019 A1 Nov. 21, 2024

(51) Int. Cl.
*G01F 1/698* (2006.01)
*G01F 1/684* (2006.01)
*G01F 1/688* (2006.01)

(52) U.S. Cl.
CPC .......... *G01F 1/6986* (2013.01); *G01F 1/6888* (2013.01)

(58) Field of Classification Search
CPC ..... G01F 1/6986; G01F 1/6888; G01F 1/6845
See application file for complete search history.

(56) References Cited

U.S. PATENT DOCUMENTS

| 10,775,217 B1 | 9/2020 | Higashi et al. |
| 11,022,590 B2 | 6/2021 | Wiget et al. |
| 2004/0040592 A1 | 3/2004 | Schneider |

(Continued)

FOREIGN PATENT DOCUMENTS

| CN | 101433125 A | * 5/2009 | ............. H05B 3/143 |
| CN | 215811050 U | 2/2022 | |

(Continued)

OTHER PUBLICATIONS

Extended European Search Report Mailed on Oct. 29, 2024 for EP Application No. 24170456, 8 page(s).

(Continued)

*Primary Examiner* — Laura Martin
*Assistant Examiner* — Anthony W Megna Fuentes
(74) *Attorney, Agent, or Firm* — Alston & Bird LLP

(57) ABSTRACT

Various methods, apparatuses, and systems for sensing a flow of fluid are provided. The apparatus includes, but not limited to: a membrane structure defining a heated area; a heating structure disposed over the membrane structure and configured to heat the heated area, where the heating structure has a centerline; a first thermopile including a plurality of first thermocouples disposed upstream of the centerline, where at least a portion of the plurality of first thermocouples are disposed over the membrane structure and at least one junction of the plurality of first thermocouples has rounded corners; and a second thermopile including a plurality of second thermocouples disposed downstream of the centerline, where at least a portion of the plurality of second thermocouples are disposed over the membrane structure and at least one junction of the plurality of second thermocouples has rounded corners.

20 Claims, 40 Drawing Sheets

(56) References Cited

U.S. PATENT DOCUMENTS

| | | | |
|---|---|---|---|
| 2005/0029596 A1 | 2/2005 | Rodov et al. | |
| 2007/0011867 A1* | 1/2007 | Yao | G01F 1/6845 29/611 |
| 2019/0331514 A1* | 10/2019 | De Luca | G01F 1/6888 |
| 2020/0370938 A1 | 11/2020 | Higashi et al. | |
| 2021/0116282 A1 | 4/2021 | De Luca et al. | |
| 2021/0396562 A1 | 12/2021 | Beck et al. | |

FOREIGN PATENT DOCUMENTS

| | | | |
|---|---|---|---|
| EP | 3404373 B1 | 3/2020 | |
| KR | 10-2009-0052173 A | 5/2009 | |
| WO | WO-2022123841 A1 * | 6/2022 | G01F 1/692 |

OTHER PUBLICATIONS

Burlyn E. Michel, "A Miniature Stem Thermocouple Hygrometer," Plant Physiol., 60:645-647, (1977). [Retrieved from the Internet Oct. 18, 2023: URL: <https://academic.oup.com/plphys/article-pdf/60/4/645/35582059/plphys_v60_4_645.pdf>].

* cited by examiner

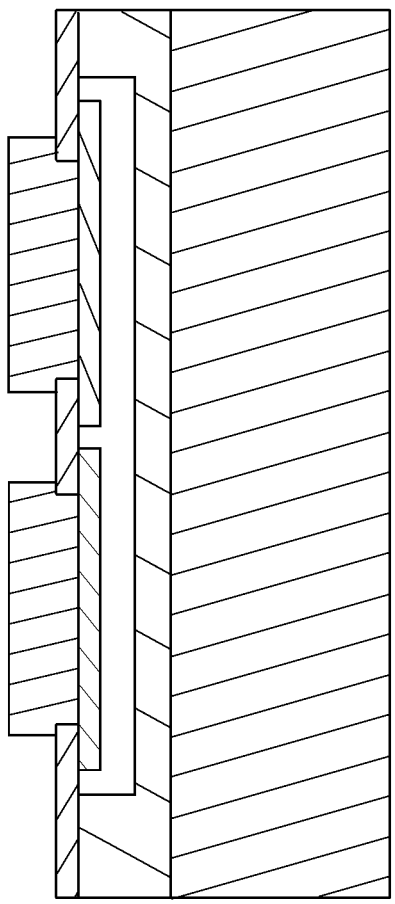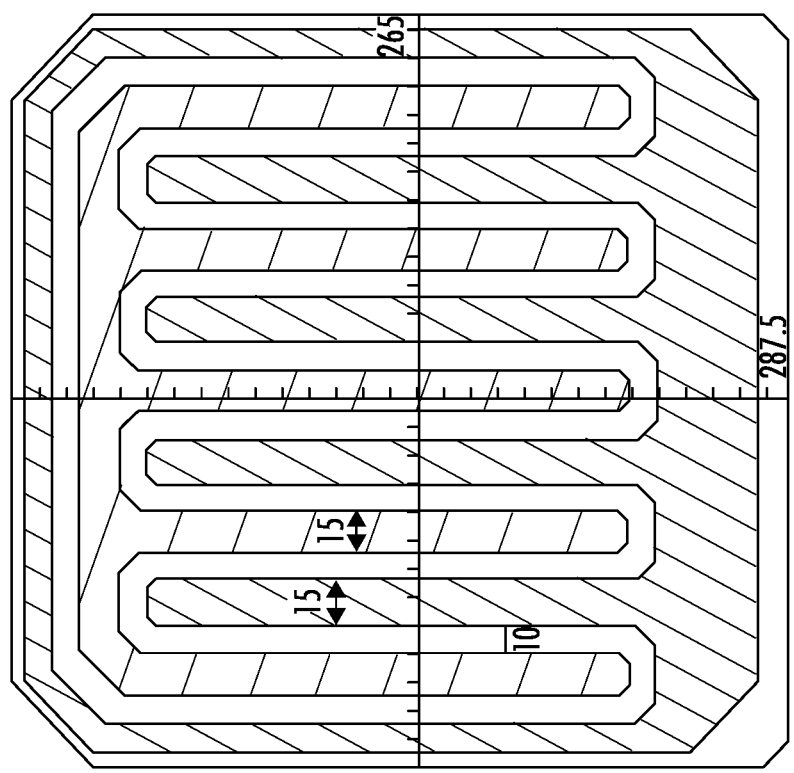
FIG. 11

THERMOPILE-BASED FLOW SENSING APPARATUS WITH ELECTROSTATIC PROTECTION

FIELD OF THE INVENTION

Exemplary embodiments of the present disclosure relate generally to flow sensing apparatuses, and more particularly, to thermopile-based flow sensing apparatuses.

BACKGROUND

Thermopile-based flow sensors may be used to measure a flow rate and/or quantity of a flowing media (e.g., moving liquid or gaseous substance) and may be implemented in various applications. Such flow sensing apparatuses are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems for improving sensitivity and performance of an apparatus such as, for example, a flow sensing apparatus.

In accordance with various examples of the present disclosure, an apparatus for sensing a flow of fluid is provided. The apparatus includes, but not limited to: a membrane structure defining a heated area; a heating structure disposed over the membrane structure and configured to heat the heated area, where the heating structure has a centerline; a first thermopile including a plurality of first thermocouples disposed upstream of the centerline, where at least a portion of the plurality of first thermocouples are disposed over the membrane structure and each junction of the plurality of first thermocouples has rounded corners; and a second thermopile including a plurality of second thermocouples disposed downstream of the centerline, where at least a portion of the plurality of second thermocouples are disposed over the membrane structure and each junction of the plurality of second thermocouples has rounded corners.

In some embodiments, the heating structure comprises a heater with curved and non-sharp corners.

In some embodiments, the apparatus further includes, but not limited to an electrostatic discharge (ESD) circuit with a diode to protect the heating structure during an ESD pulse, wherein the ESD circuit is electrically connected with the heating structure in parallel.

In some embodiments, the diode is an ESD diode that breaks down and creates a pathway to divert a current away from the heating structure.

In some embodiments, the apparatus further includes, but not limited to an electrostatic discharge (ESD) circuit with a diode to protect the first thermopile during an ESD pulse.

In some embodiments, the diode is an ESD diode that breaks down and creates a pathway to divert a current away from the first thermopile.

In some embodiments, the apparatus further includes, but not limited to an electrostatic discharge (ESD) circuit with a diode to protect the second thermopile during an ESD pulse.

In some embodiments, the diode is an ESD diode that breaks down and creates a pathway to divert a current away from the second thermopile.

In some embodiments, the apparatus further includes, but not limited to at least one thin-film resistor configured to measure an ambient temperature out of the heated area.

In some embodiments, the apparatus further includes, but not limited to a diode configured to measure an ambient temperature out of the heated area.

In some embodiments, the plurality of first thermocouples are aligned perpendicular to the centerline, and the plurality of second thermocouples are aligned perpendicular to the centerline.

In some embodiments, the heating structure has an axis perpendicular to the centerline, wherein: the first thermopile including a plurality of third thermocouples disposed upstream of the centerline and on a first side of the axis and a plurality of fourth thermocouples disposed upstream of the centerline and on a second side of the axis, and the second thermopile including a plurality of fifth thermocouples disposed downstream of the centerline and on the first side of the axis and a plurality of sixth thermocouples disposed downstream of the centerline and on the second side of the axis.

In some embodiments, each of the plurality of first thermocouples includes, but not limited to a first interface between a first thermocouple material and a second thermocouple material, and each of the plurality of second thermocouples includes, but not limited to a second interface between the first thermocouple material and the second thermocouple material.

In some embodiments, the first thermocouple material includes, but not limited to n-type polysilicon, and the second thermocouple material includes, but not limited to p-type polysilicon.

In some embodiments, the first thermocouple material includes, but not limited to a nickel-iron alloy, and wherein the second thermocouple material includes, but not limited to chromium, chromium disilicide, or rhenium disilicide.

In some embodiments, the first thermocouple material includes, but not limited to chromium nitride, and wherein the second thermocouple material includes, but not limited to copper or aluminum.

In accordance with various examples of the present disclosure, a method for manufacturing an apparatus for sensing a flow of fluid is provided. The method includes, but not limited to: providing a membrane structure defining a heated area; disposing a heating structure over the membrane structure, wherein the heating structure has a centerline; disposing a first thermopile upstream of the centerline, wherein the first thermopile includes a plurality of first thermocouples, at least a portion of the plurality of first thermocouples are disposed over the membrane structure, and each junction of the plurality of first thermocouples has rounded corners; and disposing a second thermopile disposed downstream of the centerline, wherein the second thermopile includes a plurality of second thermocouples, at least a portion of the plurality of second thermocouples are disposed over the membrane structure, and each junction of the plurality of second thermocouples has rounded corners.

In some embodiments, the heating structure includes, but not limited to a heater with curved and non-sharp corners.

In some embodiments, the method further includes, but not limited to providing an electrostatic discharge (ESD) circuit with a diode to protect the heating structure during an ESD pulse.

In some embodiments, the diode is an ESD diode that breaks down and creates a pathway to divert a current away from the heating structure, wherein the ESD circuit is electrically connected with the heating structure in parallel.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIG. 11 illustrates a schematic diagram depicting cross-sectional views for an example ESD diode in accordance with various embodiments of the present disclosure;

FIGS. 12A, 12B, 12C, 12D, 12E, 12F, 12G, 12H, 12I, 12J, 12K, 12L, 12M, 12N, 12O, 12P, 12Q, 12R, 12S, 12T, 12U, 12V, 12W, 12X, 12Y, 12Z, 12AA, and 12BB illustrate an example process flow for fabricating an example thermopile-based flow sensing apparatus in accordance with various embodiments of the present disclosure.

DETAILED DESCRIPTION OF THE INVENTION

Figure 1:
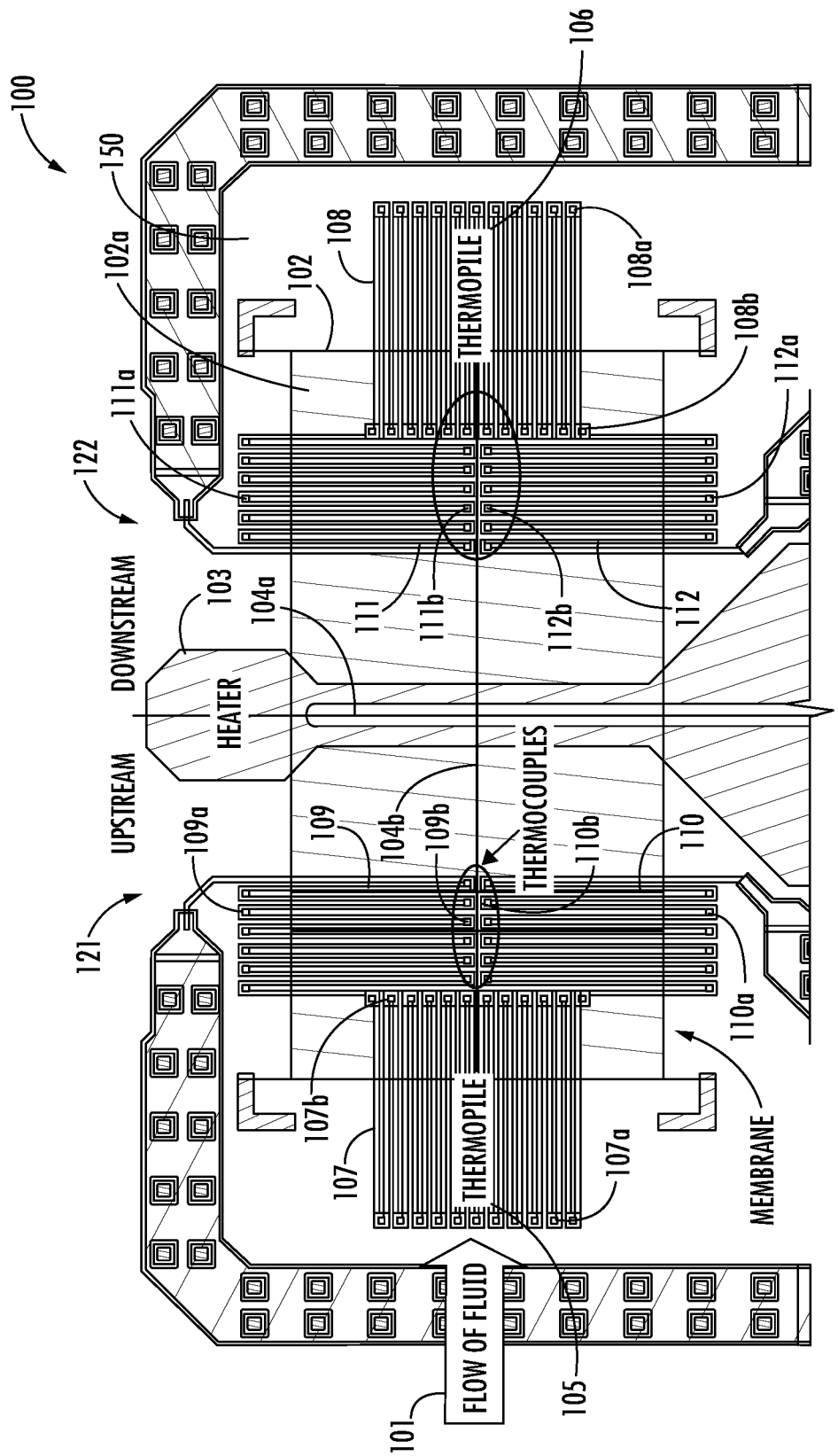
FIG. 1 illustrates a schematic diagram depicting an example layout for an example thermopile-based flow sensing apparatus in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in a dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The term "electronically coupled" or "in electronic communication with" in the present disclosure refers to two or more electrical elements (for example, but not limited to, an example processing circuitry, communication module, input/output module memory, humidity sensing component, cooling element, gas detection component) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

The term "flow sensing apparatus" may refer to an apparatus that may detect, measure, and/or identify flow rate(s) (including, but not limited to, linear flow velocity, nonlinear flow velocity, mass flow rate, and/or volumetric flow rate) of a flowing media or medium. In the present disclosure, the term "flowing media" refers to a substance (such as, but not limited to, a liquid substance and/or a gaseous substance, such as air).

The term "thermopile" may refer to an electrical device comprising a plurality of thermocouples connected in series or parallel to convert thermal energy into electrical energy. In the present disclosure, the term "thermocouple" refers to an electrical device containing two wires made of different metals joined together to produce an electrical current at differing temperatures.

Thermopile-based flow sensing apparatuses may be utilized in a variety of applications including medical and industrial applications. For example, thermopile-based flow sensing apparatuses may be utilized in drug delivery, respirators, ventilators, anesthesia machines, and/or the like. For example, a thermopile-based flow sensing apparatus may be implemented in a patient requiring treatment such as, but are not limited to, for drug delivery, dialysis or hematology.

In some examples, precise measurement and/or control for the thermopile-based flow sensing apparatuses may be required. In some examples, the thermopile-based flow sensing apparatuses may include thermopiles and a heating structure. In such examples, electrostatic discharges (ESD) may affect transducer in the thermopile-based flow sensing apparatuses. For example, thermopiles of the thermopile-based flow sensing apparatuses are highly sensitive to the ESD. For example, the heat structure may also be susceptible to the ESD at some locations of the heating structure. For example, a disposable flow sensor or any other flow sensor with external electrical connections that may be touched by someone handling them may need the ESD protection.

In some additional examples, an ESD may pass current to the patient if the thermopile-based flow sensing apparatuses are damaged due to the ESD. Additionally or alternatively, performance of thermopile-based flow sensing apparatuses may be negatively impacted, in some examples, by an ESD.

Using the systems, apparatuses and techniques disclosed herein, example thermopile-based flow sensing apparatuses configured to be protected from an ESD thereof are provided. The example thermopile-based flow sensing apparatuses, in some embodiments, may comprise thermopiles with thermocouples having rounded or otherwise dulled (e.g., not sharp or angled) corners. In some embodiments, an example thermopile-based flow sensing apparatus may comprise a heating structure having curved, rounded, and/or non-sharp corners. In some embodiments, an example thermopile-based flow sensing apparatus may further comprise an electrostatic discharge (ESD) protection circuit to protect electric components of the example thermopile-based flow sensing apparatuses from the ESD.

To address exemplary challenges and limitations associated with measuring flow rates, various examples of the present disclosure may be provided. For example, various examples of the present disclosure may provide example thermopile-based flow sensing apparatuses, methods, computer program products, and systems.

Referring now to FIG. 1, a schematic diagram depicting an example layout for an example thermopile-based flow sensing apparatus 100 in accordance with various embodiments of the present disclosure is provided.

In some embodiments, the example thermopile-based flow sensing apparatus 100 may be provided for sensing a flow of fluid 101 (e.g., a flow of a gas or liquid). In some embodiments, the example thermopile-based flow sensing apparatus 100 may comprise a membrane structure 102. For example, the membrane structure 102 may define a heated area 102a on a bulk silicon die 150. The example thermopile-based flow sensing apparatus 100 may further comprise a heating structure 103 having a centerline 104a and an axis 104b arranged perpendicular or substantially perpendicular to the centerline 104a. In some examples, the membrane structure 102 may be a thermally isolated structure and may define a heated area 102a. In some examples, the heating structure 103 may be disposed over or otherwise about the membrane structure 102 and is configured to heat the heated area 102a of the membrane structure 102.

In some embodiments, the example thermopile-based flow sensing apparatus 100 may further comprise a first thermopile 105 disposed upstream of the centerline 104a and a second thermopile 106 disposed downstream of the centerline 104a. For example, upstream of the centerline 104a is a side of the centerline 104a opposite to a flow direction of the flow of fluid 101. For example, downstream of the centerline 104a is a side of the centerline 104a in the flow direction of the flow of fluid 101.

In some embodiments, at least a portion of the first thermopile 105 may be disposed over or otherwise about the membrane structure 102. In some embodiments, at least a portion of the second thermopile 106 may be disposed over or otherwise about the membrane structure 102.

In some embodiments, the first thermopile 105 may comprise a plurality of first thermocouples 107 disposed upstream of the centerline 104a of the heating structure 103. In some embodiments, the plurality of first thermocouples 107 are aligned substantially perpendicular to the centerline 104a of the heating structure 103, such that the plurality of first thermocouples 107 have a plurality of first thermocouple junctions 107a (e.g., eleven thermocouple junctions) and a plurality of second thermocouple junctions 107b (e.g., twelve thermocouple junctions).

In some embodiments, the plurality of first thermocouple junctions 107a are disposed out of the heated area 102a and the plurality of second thermocouple junctions 107b are disposed on or substantially adjacent the heated area 102a.

In some embodiments, the second thermopile 106 may comprise a plurality of second thermocouples 108 disposed downstream of the centerline 104a of the heating structure 103. In some embodiments, the plurality of second thermocouples 108 are aligned substantially perpendicular to the centerline 104a of the heating structure 103, such that the plurality of second thermocouples 108 have a plurality of third thermocouple junctions 108a (e.g., eleven thermocouple junctions) and a plurality of fourth thermocouple junctions 108b (e.g., twelve thermocouple junctions).

In some embodiments, the plurality of third thermocouple junctions 108a are disposed out of the heated area 102a and the plurality of fourth thermocouple junctions 108b are disposed on or substantially adjacent the heated area 102a.

In some embodiments, the first thermopile 105 may further comprise a plurality of third thermocouples 109 disposed on a first side of the axis 104b and upstream of the centerline 104a of the heating structure 103, and a plurality of fourth thermocouples 110 disposed on a second side of the axis 104b and upstream of the centerline 104a of the heating structure 103. In some embodiments, the plurality of third thermocouples 109 are aligned substantially parallel to the centerline 104a of the heating structure 103, such that the plurality of third thermocouples 109 have a plurality of fifth thermocouple junctions 109a (e.g., six thermocouple junctions) and a plurality of sixth thermocouple junctions 109b (e.g., seven thermocouple junctions). In some embodiments, the plurality of fourth thermocouples 110 are aligned substantially parallel to the centerline 104a of the heating structure 103, such that the plurality of fourth thermocouples 110 have a plurality of seventh thermocouple junctions 110a (e.g., six thermocouple junctions) and a plurality of eighth thermocouple junctions 110b (e.g., seven thermocouple junctions).

In some embodiments, the plurality of fifth thermocouple junctions 109a are disposed out of the heated area 102a and the plurality of sixth thermocouple junctions 109b are disposed on the heated area 102a. In some embodiments, the plurality of seventh thermocouple junctions 110a are disposed out of the heated area 102a and the plurality of eighth thermocouple junctions 110b are disposed on the heated area 102a.

In some embodiments, the second thermopile 106 may further comprise a plurality of fifth thermocouples 111 disposed on a first side of the axis 104b and upstream of the centerline 104a of the heating structure 103, and a plurality of sixth thermocouples 112 disposed on a second side of the axis 104b and downstream of the centerline 104a of the heating structure 103. In some embodiments, the plurality of fifth thermocouples 111 are aligned substantially parallel to the centerline 104a of the heating structure 103, such that the plurality of fifth thermocouples 111 have a plurality of ninth thermocouple junctions 111a (e.g., six thermocouple junctions) and a plurality of tenth thermocouple junctions 111b (e.g., seven thermocouple junctions). In some embodiments, the plurality of sixth thermocouples 112 are aligned substantially parallel to the centerline 104a of the heating structure 103, such that the plurality of fifth thermocouples 112 have a plurality of eleventh thermocouple junctions 112a (e.g., six thermocouple junctions) and a plurality of twelfth thermocouple junctions 112b (e.g., seven thermocouple junctions).

In some embodiments, the plurality of ninth thermocouple junctions 111a are disposed out of the heated area 102a and the plurality of tenth thermocouple junctions 111b are disposed on the heated area 102a. In some embodiments, the plurality of eleventh thermocouple junctions 112a are disposed out of the heated area 102a and the plurality of twelfth thermocouple junctions 112b are disposed on the heated area 102a.

In some embodiments, as discussed with reference to FIG. 1, the heating structure 103 may be located between at least two sets of thermocouples (e.g., two thermopiles 105 and 106), with one set of thermocouples located upstream of the heating structure and the other set of thermocouples located downstream of the heating structure. In these arrangements, each set of thermocouples has one side on the bulk silicon die 150, which can float in temperature.

In some embodiments, the following equation may be used to characterize the thermopile-based flow sensing apparatus disclosed herein:

$$\Delta V = n\Delta S(\Delta T) \quad (1)$$

where $\Delta V$=potential difference; n=the number of thermocouples; S=Seebeck coefficient (also referred to as thermopower, thermoelectric power (TE), or thermoelectric sensitivity); $\Delta S = TE_1 - TE_2$ (the thermoelectric power of the first thermoelectric material–the thermoelectric power of the second thermoelectric material); T=temperature; and $\Delta T = T_1 - T_{ref}$ (the temperature at the measured thermoelectric junction(s)–the temperature at the reference thermoelectric junction(s)). In some instances, such as is shown in FIG. 1, $T_1$ may be measured on the membrane structure 102 using the fourth thermocouple junctions 108b, and $T_{ref}$ (e.g. an ambient temperature of the bulk silicon die 150 positioned out of the heated area 102a) may be measured on the bulk silicon die 150 using the third thermocouple junctions 108a. In other instances, such as is shown in FIG. 1, the relative temperature difference $T_1$ may be measured on the membrane structure 102 using the second thermocouple junctions 107b and $T_{ref}$ may be measured on the bulk silicon die 150 using the first thermocouple junctions 107a.

In some embodiments, as shown in FIG. 1, the bulk silicon die 150 positioned out of the heated area 102a of the membrane structure 102 and the bulk silicon die 150 positioned on the heated area 102a of the membrane structure 102 may have different temperatures due to the heating of the heating structure 103. For example, the first thermopile 105 may output a first potential difference that depends on the temperature difference between the bulk silicon die 150 off the membrane structure 102 and on the heated area 102a of the membrane structure 102 in the upstream region 121. For example, the second thermopile 106 may output a second potential difference that depends on the temperature difference between the bulk silicon die 150 off the membrane structure 102 and on the heated area 102a of the membrane structure 102 in the downstream region 122.

In some embodiments, the difference between the first potential difference and the second potential difference depends directly, in some examples, on the flow of the fluid 101. In some embodiments, a flow rate of the flow of the fluid 101 may be measured by calculating the difference between the first potential difference and the second potential difference.

In some embodiments, the number of thermocouple junctions in the thermopile of an example thermopile-based flow sensing apparatus disclosed herein may depend on (e.g., may be a function of) the Seebeck coefficients of the thermocouple materials in the thermocouples of the thermopile and the desired output voltage.

Figure 2:
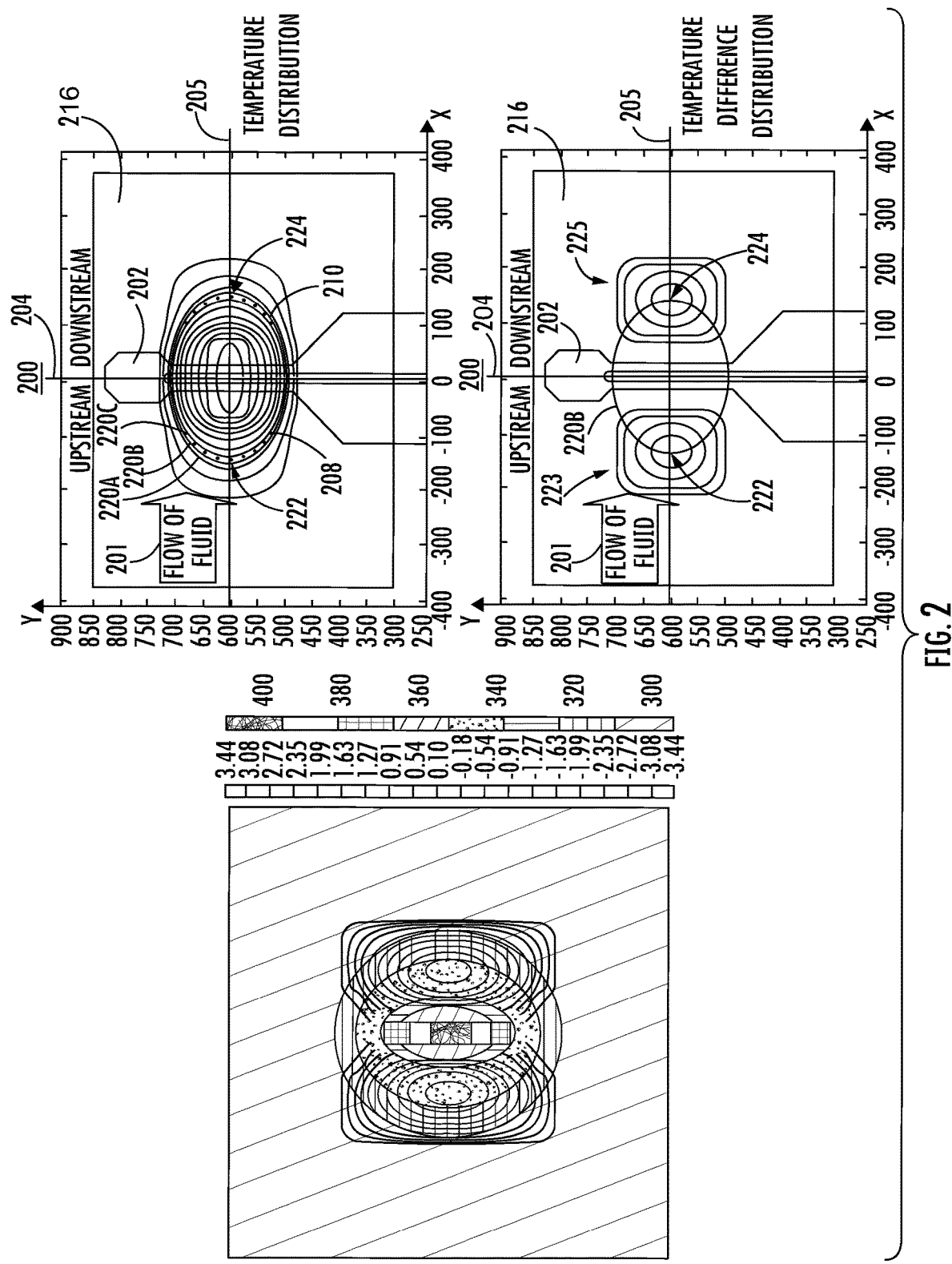
FIG. 2 illustrates a schematic diagram depicting a simulation of temperature distributions and temperature difference distributions on the membrane structure in accordance with various embodiments of the present disclosure.

Referring now to FIG. 2, a schematic diagram depicting a simulation of temperature distributions and temperature difference distributions on the membrane structure in accordance with various embodiments of the present disclosure is provided.

As shown on the left of FIG. 2, locations of hot thermocouples are demonstrated. On the right top of FIG. 2, example temperature isolines 220 (e.g., including, but not limited to, temperature isoline 220A, temperature isoline 220B, and temperature isoline 220C) for an example thermopile-based flow sensing apparatus are illustrated. On the right bottom of FIG. 2, example temperature difference isolines 223 disposed around the temperature location 222 and temperature difference isolines 225 disposed around the temperature location 224 are illustrated.

In some embodiments, the temperature distributions and temperature difference distributions on the membrane structure 102 may change with changes in the membrane structure 102 (e.g., shape, thickness), heating structure 103 (e.g., shape, thickness, material(s)), voltage applied to the heating structure 103, and other structures. In some embodiments, the temperature distributions and temperature difference distributions on the membrane structure 102 may be used to calculate the flow rate of the flow of the fluid 101.

Figure 3:
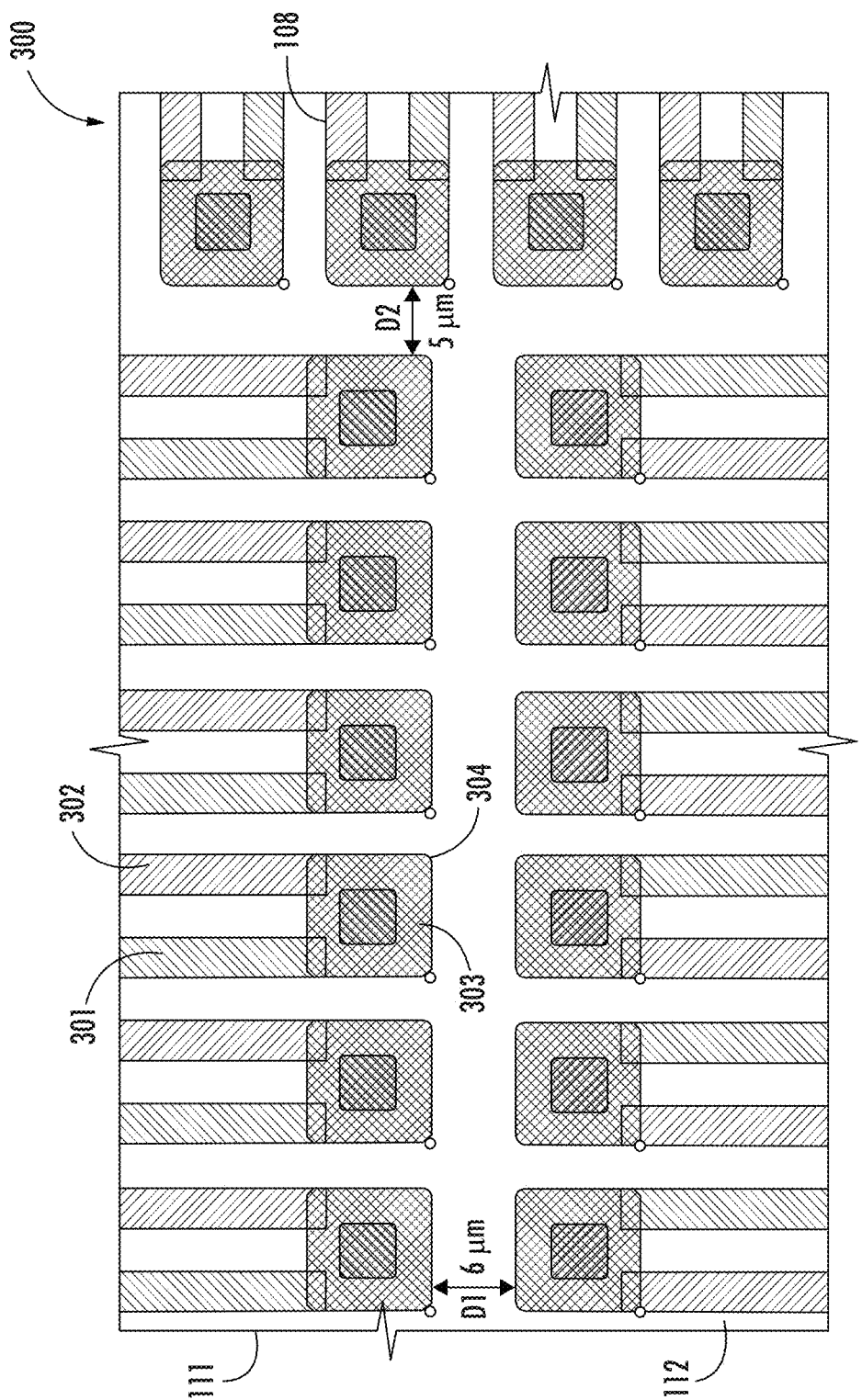
FIG. 3 illustrates a schematic diagram depicting a close-up view of a thermopile of an example thermopile-based flow sensing apparatus in accordance with various embodiments of the present disclosure.

Referring now to FIG. 3, a schematic diagram depicting a close-up view 300 of an example thermopile of an example thermopile-based flow sensing apparatus 100 in accordance with various embodiments of the present disclosure is provided.

In some embodiments, as shown in FIG. 3, an example thermopile 106 (e.g., including, but not limited to, the first thermopile 105 and the second thermopile 106), for an example, may be disposed downstream of the centerline 104a of the heating structure 103. The example thermopile 106 may comprise a plurality of second thermocouples 108 aligned substantially perpendicular to the centerline 104a of the heating structure 103, a plurality of fifth thermocouples 111 aligned substantially parallel to the centerline 104a of the heating structure 103, and a plurality of sixth thermocouples 112 aligned substantially parallel to the centerline 104a of the heating structure 103.

In some embodiments, as shown in FIG. 3, a thermocouple (e.g. each of the thermocouples 108, 111, and 112) may comprise a first thermocouple material 301, a second thermocouple material 302, and a thermocouple junction 303, where the first thermocouple material 301 and a second thermocouple material 302 are in contact with each other.

In some embodiments, the thermocouple junction 303 may be shaped as a rectangle. As shown in FIG. 3, at least one of the corners 304 of the rectangle may be rounded. In some embodiments, the thermocouple junction 303 may be shaped in other forms, such as, including but not limited to, a square. For example, the thermocouple junction 303 may be shaped in a square with at least one rounded corners or at least one rounded edges. For example, the thermocouple junction 303 may be shaped in a circle.

In some embodiments, the thermocouple junction 303 may be shaped as a rectangle or a square with all corners rounded.

In some embodiments, the thermocouple junction 303 may comprise an interface between the first thermocouple material 301 and the second thermocouple material 302.

In some embodiments, the first thermocouple material may comprise polysilicon, and the second thermocouple material may comprise aluminum. In some embodiments, the first thermocouple material and the second thermocouple material may comprise differently doped polysilicon (e.g., n-type and p-type polysilicon). For example, the first thermocouple material may comprise n-type polysilicon (nPoly Si), and the second thermocouple material may comprise p-type polysilicon (pPoly Si). In another example, the first thermocouple material may comprise p-type polysilicon (pPoly Si), and the second thermocouple material may comprise n-type polysilicon (nPoly Si).

In some embodiments, the first thermocouple material may comprise a nickel-iron alloy (e.g., 60:40 NiFe, 80:20 NiFe), and the second thermocouple material may comprise chromium (Cr), where the difference between the Seebeck coefficients of the thermocouple materials (dS) is about 65 uV/C for 60:40 NiFe and Cr or about 53 uV/C for 80:20 NiFe and Cr. In some embodiments, the first thermocouple material may comprise a nickel-iron alloy (e.g., 60:40 NiFe, 80:20 NiFe), and the second thermocouple material may comprise chromium disilicide (CrSi2), where dS is about 105 uV/C for 60:40 NiFe and CrSi2 or about 93 uV/C for 80:20 NiFe and CrSi2. In some embodiments, the first thermocouple material may comprise a nickel-iron alloy (e.g., 60:40 NiFe, 80:20 NiFe), and the second thermocouple material may comprise rhenium disilicide (ReSi2).

In some embodiments, the first thermocouple material may comprise chromium nitride (e.g., CrN), and the second thermocouple material may comprise copper (Cu), where dS is about 146 uV/C for CrN and Cu. In some embodiments, the first thermocouple material may comprise chromium nitride (e.g., CrN), and the second thermocouple material may comprise aluminum (Al), where dS is about 138 uV/C for CrN and Al. In some embodiments, the first thermocouple material may comprise a chromium nitride (e.g., CrN), and the second thermocouple material may comprise p-type polysilicon (pPoly Si), where dS is about 270 uV/C for CrN and pPoly Si.

In some embodiments, as shown in FIG. 3, the plurality of fifth thermocouples 111 and the plurality of sixth thermocouples 112 are spaced from each other, such that an electrostatic discharge between the plurality of fifth thermocouples 111 and the plurality of sixth thermocouples 112 is reduced. For example, a distance D1 between the plurality of fifth thermocouples 111 and the plurality of sixth thermocouples 112 may be in a range from 1 micrometers to 10 micrometers, preferably in a range from 4 micrometers to 8 micrometers, and more preferably at 6 micrometers.

Similarly, in some embodiments, the plurality of third thermocouples 109 and the plurality of fourth thermocouples 110 are spaced from each other, such that an electrostatic discharge between the plurality of third thermocouples 109 and the plurality of fourth thermocouples 110 is reduced. For example, a distance between the plurality of fifth thermocouples 111 and the plurality of sixth thermocouples 112 may be in a range from 1 micrometers to 10 micrometers, preferably in a range from 4 micrometers to 8 micrometers, and more preferably at 6 micrometers.

In some embodiments, as shown in FIG. 3, the plurality of fifth thermocouples 111 (or the plurality of fifth thermocouples 112) and the plurality of second thermocouples 108 are spaced from each other, such that an electrostatic discharge between the plurality of fifth thermocouples 111 (or the plurality of fifth thermocouples 112) and the plurality of second thermocouples 108 is reduced. For example, a distance D2 between the plurality of fifth thermocouples 111 (or the plurality of fifth thermocouples 112) and the plurality of second thermocouples 108 may be in a range from 1 micrometers to 10 micrometers, preferably in a range from 3 micrometers to 7 micrometers, and more preferably at 5 micrometers.

Similarly, in some embodiments, the plurality of third thermocouples 109 (or the plurality of fourth thermocouples 110) and the plurality of first thermocouples 107 are spaced from each other, such that an electrostatic discharge between the plurality of third thermocouples 109 (or the plurality of fourth thermocouples 110) and the plurality of first thermocouples 107 is reduced. For example, a distance between the plurality of third thermocouples 109 (or the plurality of fourth thermocouples 110) and the plurality of first thermocouples 107 may be in a range from 1 micrometers to 10 micrometers, preferably in a range from 3 micrometers to 7 micrometers, and more preferably at 5 micrometers.

Figure 4:
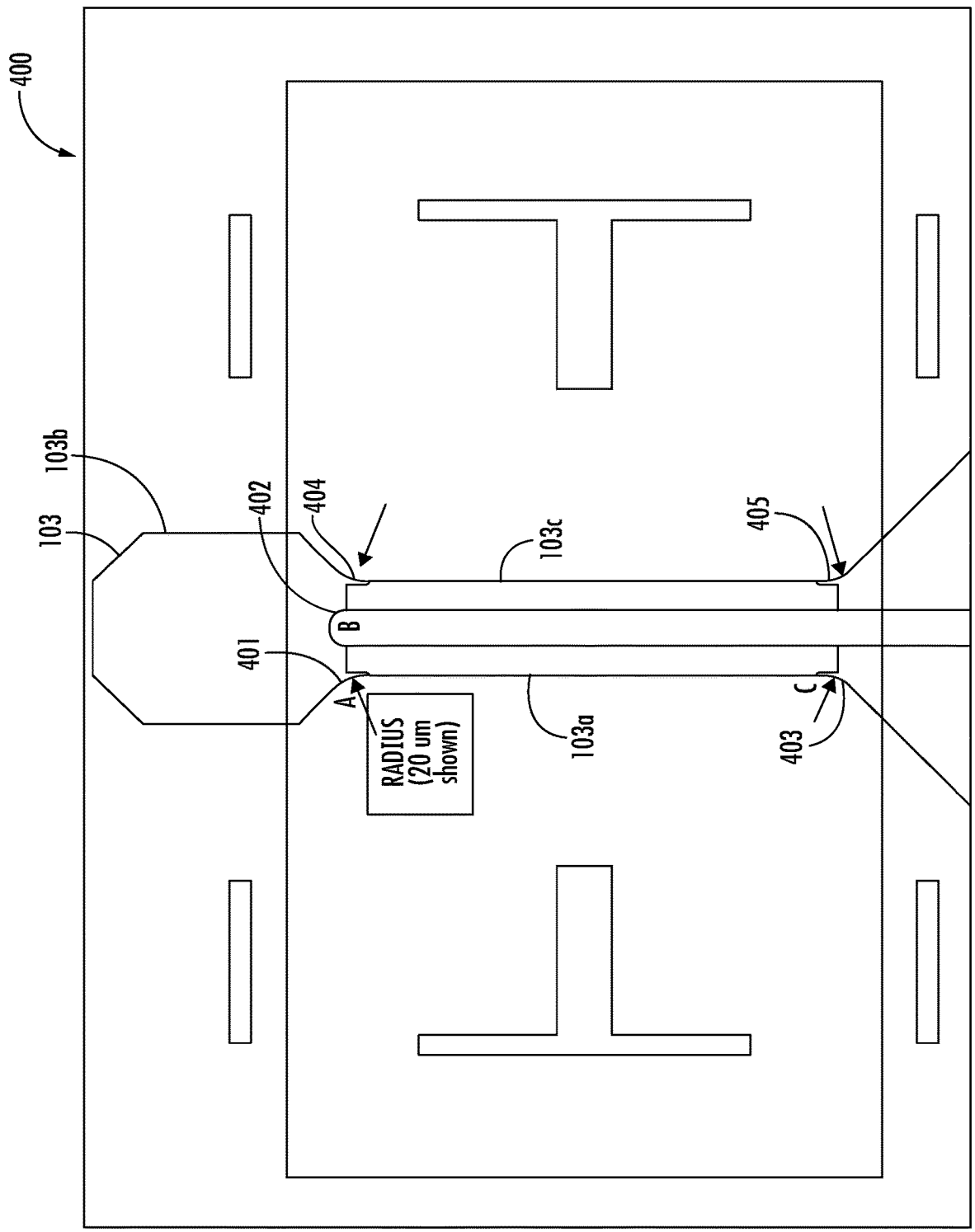
FIG. 4 illustrates a schematic diagram depicting an example layout of an example thermopile-based flow sensing apparatus in accordance with various embodiments of the present disclosure.

Referring now to FIG. 4, a schematic diagram depicting an example layout of an example thermopile-based flow sensing apparatus 400 in accordance with various embodiments of the present disclosure is provided.

In some embodiments, as shown in FIG. 4, the example thermopile-based flow sensing apparatus 400 may comprise a membrane structure 102 defining a heated area 102a and a heating structure 103 disposed over or otherwise about the membrane structure 102.

In some embodiments, the heating structure 103 may comprise a ribbon, a plate, a wire strip, and/or a layer that may be connected to an electrical power source. In some embodiments, for example, when the electrical power source is turned on, an electric current may flow through the ribbon, the plate, the wire strip, and/or the layer, which may in turn convert electrical energy to heat energy. For example, the electric current may flow through a first portion 103a, the second portion 103b, and the third portion 103c of the heating structure 103.

In some embodiments, the heating structure 103 may impart the heat energy, increase its temperature, and/or elevate the temperature of the heated area 102a of the membrane structure 102.

In some embodiments, the heating structure 103 may comprise a heater with curved, rounded, and non-sharp corners, such that the current density and the heat produced in the corners may be reduced and any breakdown on the heating structure 103 may be prevented. For example, the heating structure 103 may have a curved corner 401 at a joint between the first portion 103a and the second portion 103b of the heating structure 103. Similarly, for example, the heating structure 103 may have a curved corner 404 at a joint between the third portion 103c and the second portion 103b of the heating structure 103. In some examples, the heating structure 103 may have a curved corner 403 at a joint between the first portion 103a and a first external connection to the electrical power source. Similarly, in some examples, the heating structure 103 may have a curved corner 405 at a joint between the third portion 103c and a second external connection to the electrical power source. In additional examples, the heating structure 103 may have a curved edge 402 connecting the first portion 103a and the third portion 103c.

In some embodiments, for example, a radius of the curved corners 401, 403, 404, or 405 may be in a range from 10 micrometers to 100 micrometers, preferably in a range from 15 micrometers to 50 micrometers, and more preferably in a range from 20 micrometers to 40 micrometers. In some embodiments, for example, a radius of the curved edge 402 may be in a range from 10 micrometers to 100 micrometers, preferably in a range from 15 micrometers to 50 micrometers, and more preferably in a range from 20 micrometers to 40 micrometers.

Figure 5:
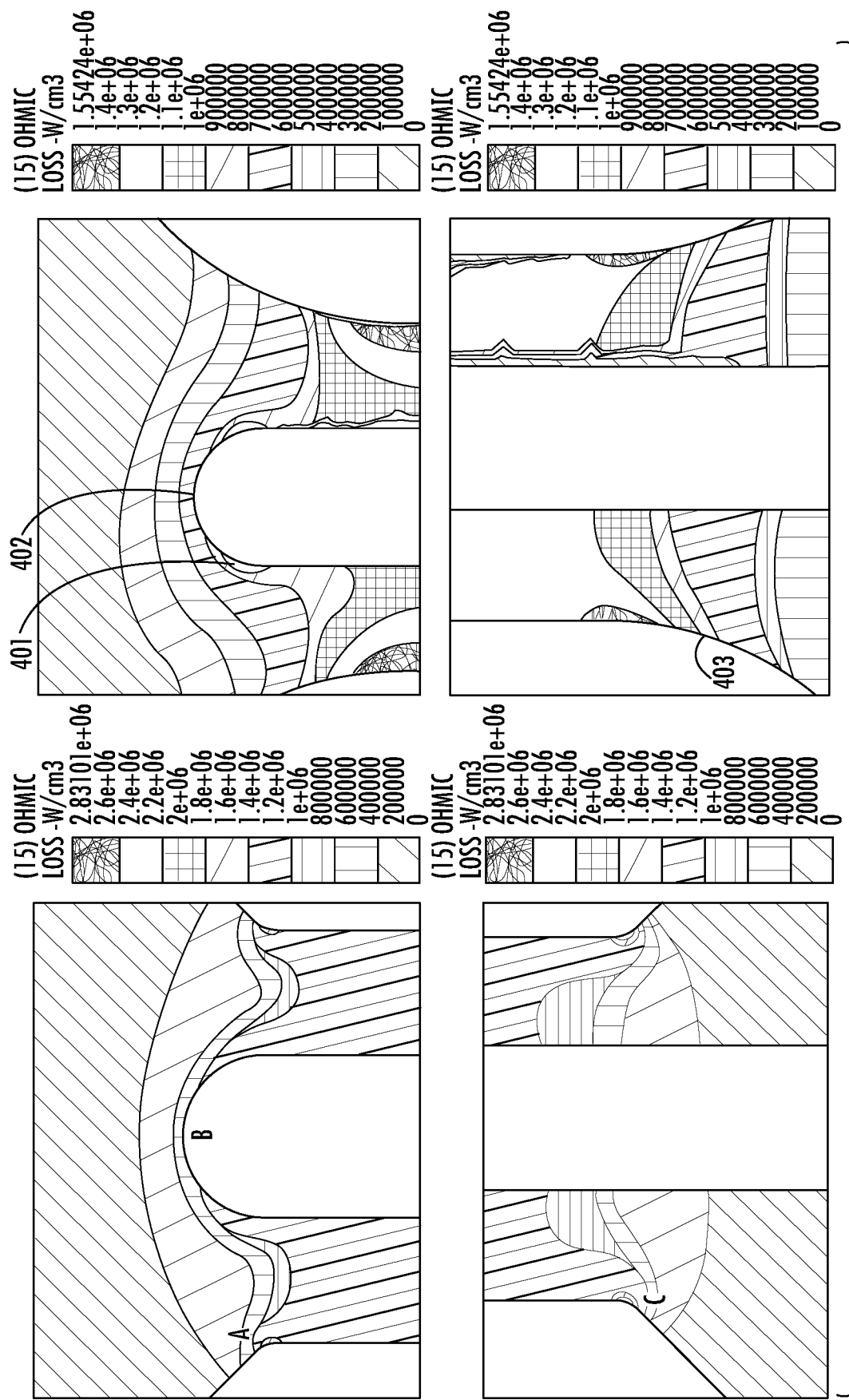
FIG. 5 illustrates a schematic diagram depicting a simulation of the ohmic loss on a heating structure with sharp corners in accordance with various embodiments of the present disclosure.

Referring now to FIG. 5, a schematic diagram depicting a simulation of ohmic loss on a heating structure with sharp corners and curved corners in accordance with various embodiments of the present disclosure is provided.

As shown on the left two images of FIG. 5, locations of highest power and current density are demonstrated. For example, the heating structure have sharp corners and the highest power and current density on the heating structure at position A and position C. For example, the ohmic losses at position A and position C are approximately $2*10^6$ W/cm$^3$.

As shown on the right two images of FIG. 5, locations of highest power and current density are also demonstrated. For example, the heating structure have curved corners 401, 402 and 403. The highest power and current density on the heating structure at curved corners 401 and 403. For example, the ohmic loss at curved corners 401 and 403 are approximately $1*10^6$ W/cm$^3$, which are much smaller than the ohmic loss on the heating structure with sharp corners.

Figure 6:
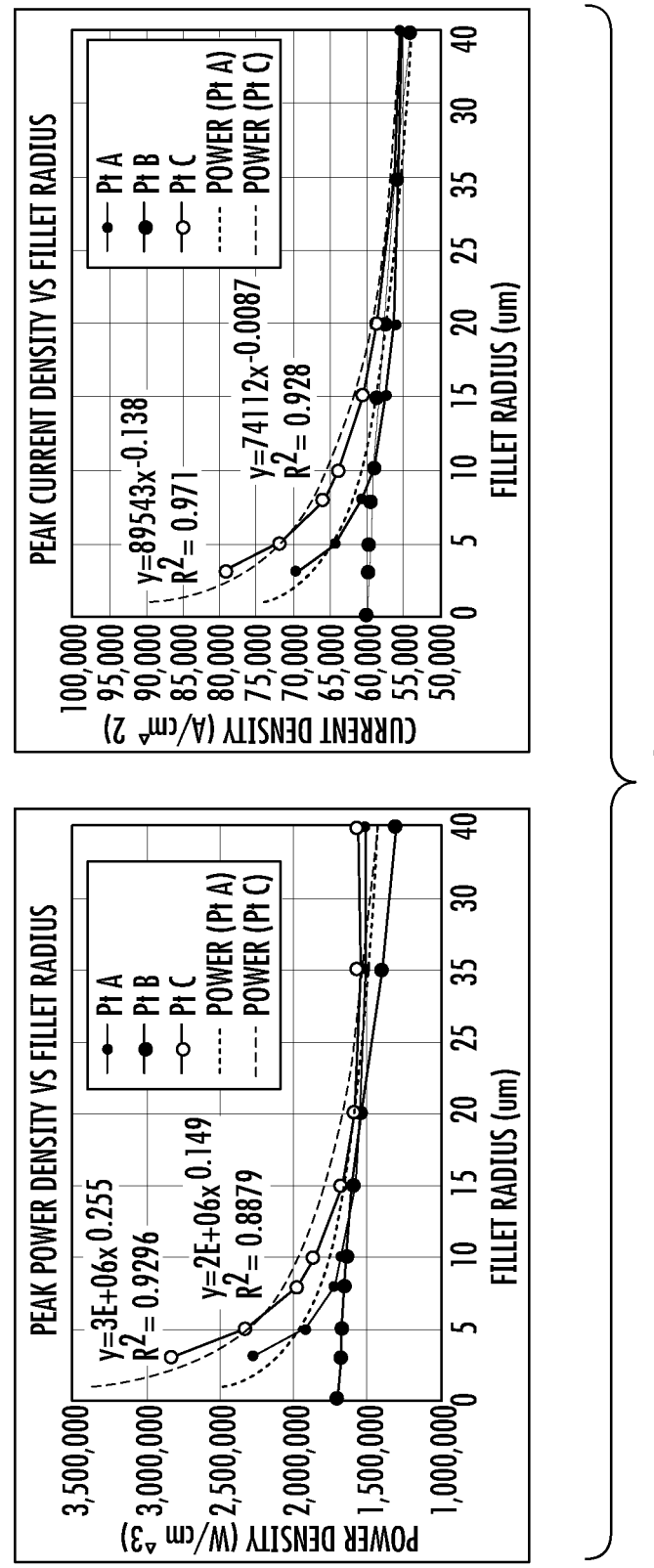
FIG. 6 illustrates a schematic diagram depicting example curves of peaking power/current density vs the Fillet radium in accordance with various embodiments of the present disclosure.

Referring now to FIG. 6, schematic diagrams depicting example curves of peaking power/current density vs the Fillet radium in accordance with various embodiments of the present disclosure is provided.

As shown in FIG. 6, for example, at positions A, B, and C, the peaking power density and the peak current density are minimized, in this example, when the Fillet radius of the curved corners 401, 402, and 403 are in a range from 20 micrometers to 40 micrometers.

Figure 7:
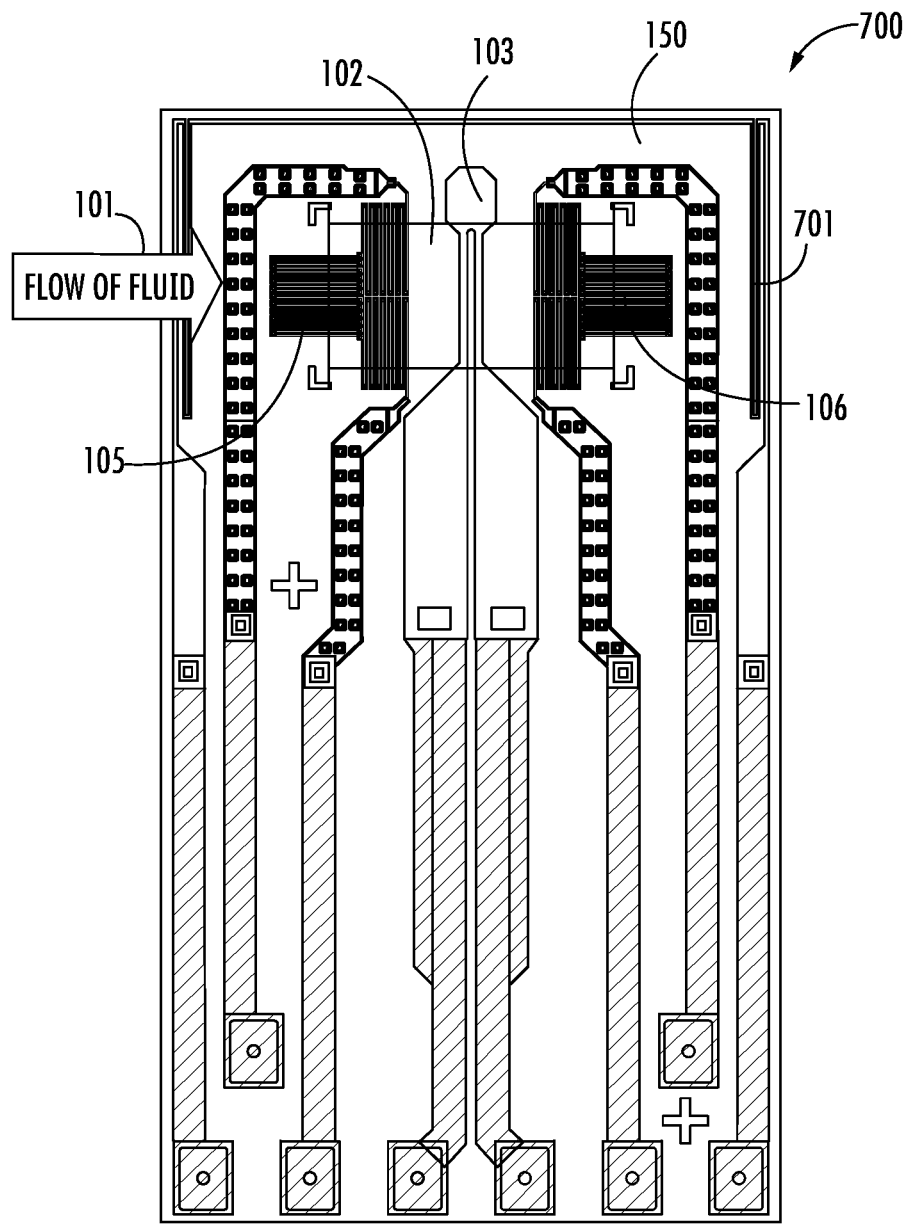
FIG. 7 illustrates a schematic diagram depicting an example layout for an example thermopile-based flow sensing apparatus in accordance with various embodiments of the present disclosure.

Referring now to FIG. 7, a schematic diagram depicting an example layout for an example thermopile-based flow sensing apparatus 700 in accordance with various embodiments of the present disclosure is provided.

In some embodiments, the example thermopile-based flow sensing apparatus 700 may be provided for sensing a flow of fluid 101 (e.g., a flow of a gas or liquid). In some embodiments, the example thermopile-based flow sensing apparatus 700 may comprise a membrane structure 102 on a bulk silicon die 150, and a heating structure 103 disposed over or otherwise about the membrane structure 102 and configured to heat a heat area of the membrane structure. In some embodiments, the example thermopile-based flow sensing apparatus 700 may further comprise a first thermopile 105 disposed upstream of the centerline 104a and a second thermopile 106 disposed downstream of the centerline 104a.

In some embodiments, the example thermopile-based flow sensing apparatus 700 may further comprise at least one resistor 701 disposed around the membrane structure 102. In some embodiments, the at least one resistor 701 may be configured to control and/or measure a temperature of the bulk silicon die 150 off the membrane structure 102.

In some examples, the at least one resistor 701 may be thin-film resistors. In some examples, a cross-section area of the thin-film resistor may have a width in a range from 0.1 micrometers to 50 micrometers, preferably in a range from 1 micrometers to 10 micrometers, and more preferably around 6 micrometers.

In some examples, a cross-section area of the heater 103 may have a width in a range from 1 micrometers to 50 micrometers, preferably in a range from 10 micrometers to 20 micrometers, and more preferably around 15 micrometers.

Figure 8:
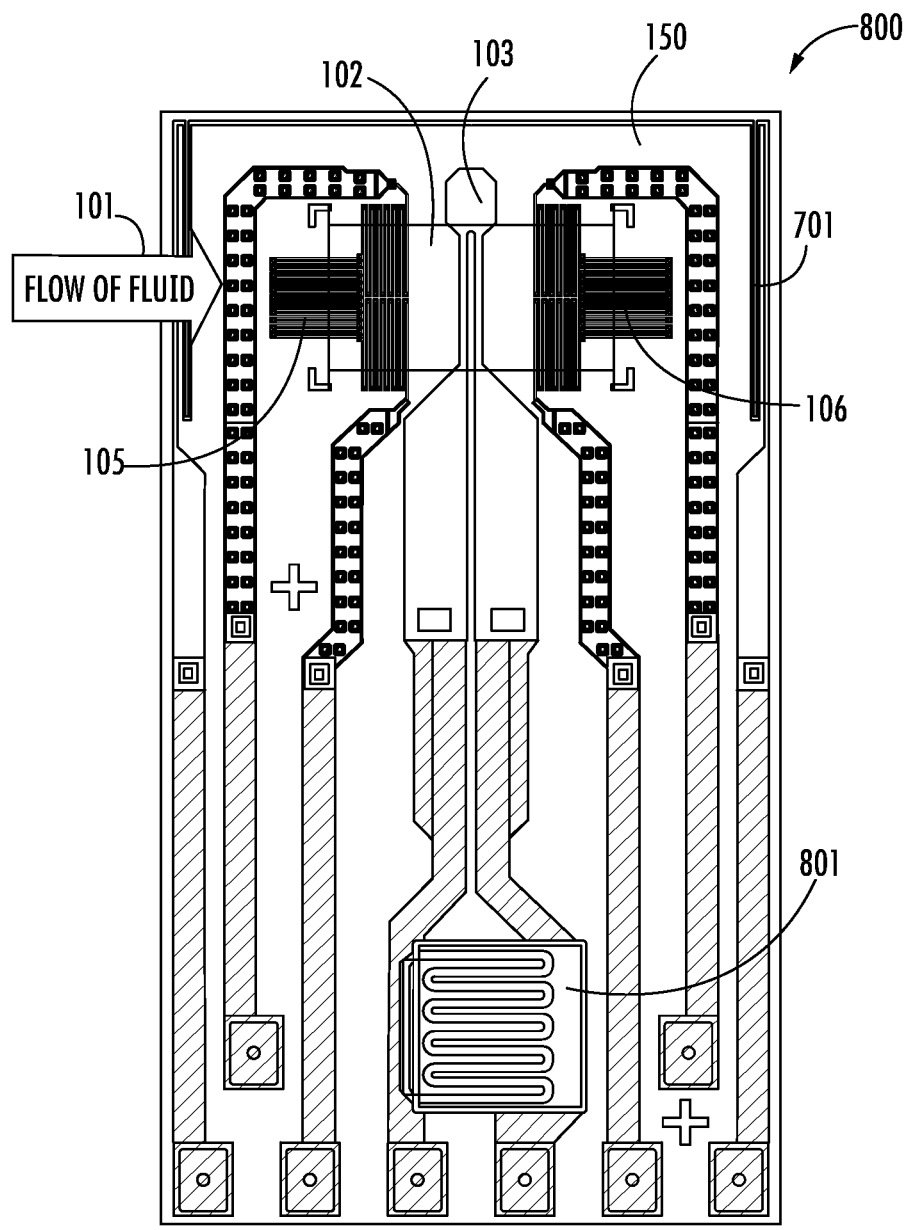
FIG. 8 illustrates a schematic diagram depicting an example layout for an example thermopile-based flow sensing apparatus in accordance with various embodiments of the present disclosure.

Referring now to FIG. 8, a schematic diagram depicting an example layout for an example thermopile-based flow sensing apparatus 800 in accordance with various embodiments of the present disclosure is provided.

In some embodiments, the example thermopile-based flow sensing apparatus 800 may be provided for sensing a flow of fluid 101 (e.g., a flow of a gas or liquid). In some embodiments, the example thermopile-based flow sensing apparatus 800 may comprise a membrane structure 102 on a bulk silicon die 150, and a heating structure 103 disposed over or otherwise about the membrane structure 102 and configured to heat a heat area of the membrane structure. In some embodiments, the example thermopile-based flow sensing apparatus 800 may further comprise a first thermopile 105 disposed upstream of the centerline 104a and a second thermopile 106 disposed downstream of the centerline 104a.

In some embodiments, the example thermopile-based flow sensing apparatus 800 may further comprise at least one resistor 701 disposed around the membrane structure 102. In some embodiments, the at least one resistor 701 may be configured to control and/or measure a temperature of the bulk silicon die 150 off the membrane structure 102.

In some embodiments, the example thermopile-based flow sensing apparatus 800 may further comprise a first electrostatic discharge (ESD) protection circuit 801. In some embodiments, the first ESD protection circuit 801 may be placed between the heating structure 103 and an electrical power source for the heating structure 103. In some examples, the first ESD protection circuit 801 is electrically connected with the heating structure in parallel, such that the heating structure 103 of the example thermopile-based flow sensing apparatus 800 may be protected from ESD.

In some embodiments, the first ESD protection circuit 801 may comprise at least one ESD diode. For example, in an instance that an ESD pulse is presented, the at least one ESD diode may break down and create a low impedance pathway which limits peak voltage/current to the heating structure 103 of the example thermopile-based flow sensing apparatus 800 by diverting the current flow to ground.

Figure 9:
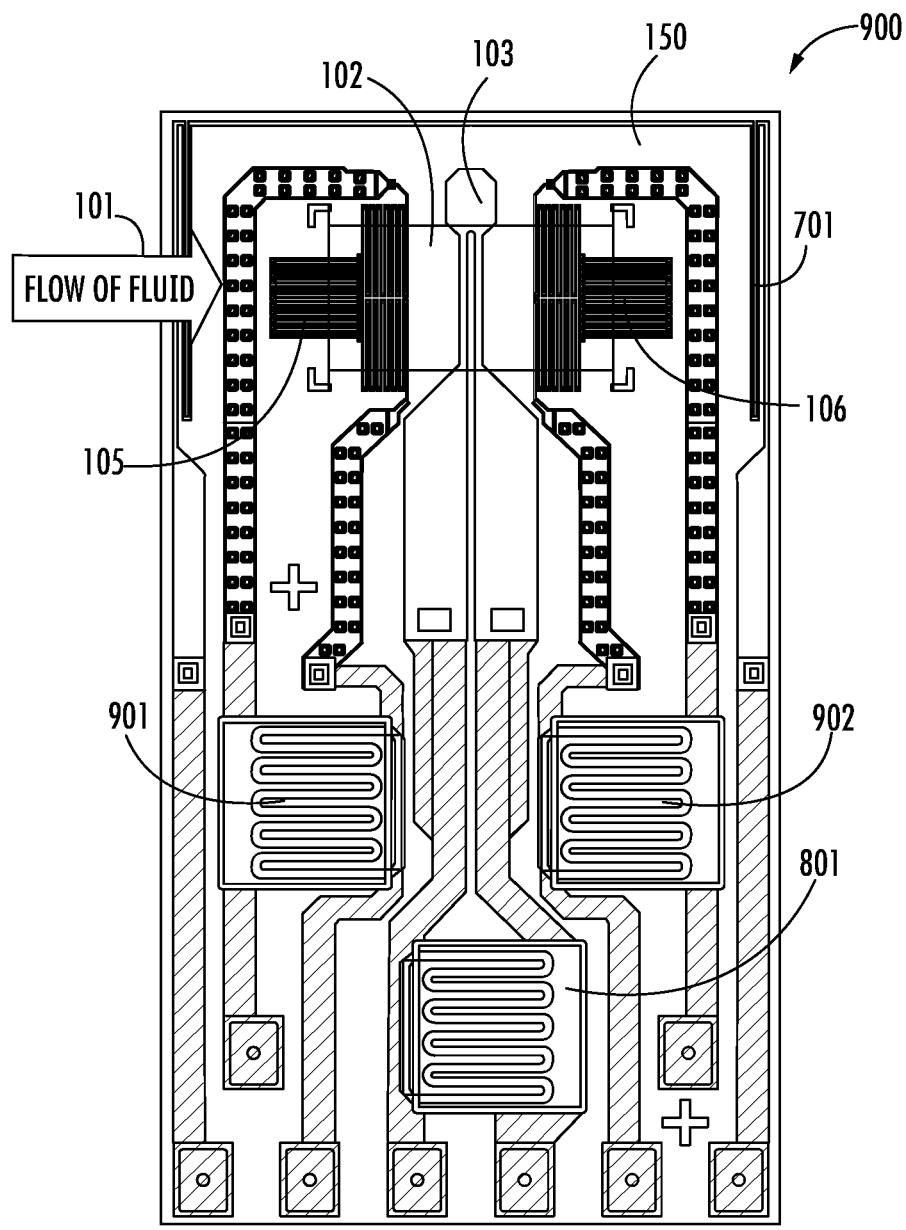
FIG. 9 illustrates a schematic diagram depicting an example layout for an example thermopile-based flow sensing apparatus 900 in accordance with various embodiments of the present disclosure.

Referring now to FIG. 9, a schematic diagram depicting an example layout for an example thermopile-based flow sensing apparatus 900 in accordance with various embodiments of the present disclosure is provided.

In some embodiments, the example thermopile-based flow sensing apparatus 900 may be provided for sensing a flow of fluid 101 (e.g., a flow of a gas or liquid). In some embodiments, the example thermopile-based flow sensing apparatus 900 may comprise a membrane structure 102 on a bulk silicon die 150, and a heating structure 103 disposed over or otherwise about the membrane structure 102 and configured to heat a heat area of the membrane structure. In some embodiments, the example thermopile-based flow sensing apparatus 900 may further comprise a first thermopile 105 disposed upstream of the centerline 104a and a second thermopile 106 disposed downstream of the centerline 104a.

In some embodiments, the example thermopile-based flow sensing apparatus 900 may further comprise at least one resistor 701 disposed around the membrane structure 102. In some embodiments, the at least one resistor 701 may be configured to control and/or measure a temperature of the bulk silicon die 150 off the membrane structure 102.

In some embodiments, the example thermopile-based flow sensing apparatus 900 may further comprise a first ESD protection circuit 801. In some embodiments, the first ESD protection circuit 801 may be placed between the heating structure 103 and an electrical power source for the heating structure 103. In some examples, the first ESD protection circuit 801 is electrically connected with the heating structure in parallel, such that the heating structure 103 of the example thermopile-based flow sensing apparatus 900 may be protected from ESD.

In some embodiments, the example thermopile-based flow sensing apparatus 900 may further comprise a second ESD protection circuit 901. In some embodiments, the second ESD protection circuit 901 may be placed between the first thermopile 105 and an electrical power source for the first thermopile 105. In some examples, the second ESD protection circuit 901 is electrically connected with the first thermopile 105 in parallel, such that the first thermopile 105 of the example thermopile-based flow sensing apparatus 900 may be protected from ESD.

In some embodiments, the example thermopile-based flow sensing apparatus 900 may further comprise a third ESD protection circuit 902. In some embodiments, the third ESD protection circuit 902 may be placed between the second thermopile 106 and an electrical power source for the second thermopile 106. In some examples, the third ESD protection circuit 902 is electrically connected with the second thermopile 106 in parallel, such that the second thermopile 106 of the example thermopile-based flow sensing apparatus 900 may be protected from ESD.

In some embodiments, the first ESD protection circuit 801 may comprise at least one ESD diode. For example, in an instance that an ESD pulse is presented, the at least one ESD diode may break down and create a low impedance pathway which limits peak voltage/current to the heating structure 103 of the example thermopile-based flow sensing apparatus 900 by diverting the current flow to ground.

In some embodiments, the second ESD protection circuit 901 may comprise at least one ESD diode. For example, in an instance that an ESD pulse is presented, the at least one ESD diode may break down and create a low impedance pathway which limits peak voltage/current to the first thermopile 105 of the example thermopile-based flow sensing apparatus 900 by diverting the current flow to ground.

In some embodiments, the third ESD protection circuit 902 may comprise at least one ESD diode. For example, in an instance that an ESD pulse is presented, the at least one ESD diode may break down and create a low impedance pathway which limits peak voltage/current to the second thermopile 106 of the example thermopile-based flow sensing apparatus 900 by diverting the current flow to ground.

Figure 10:
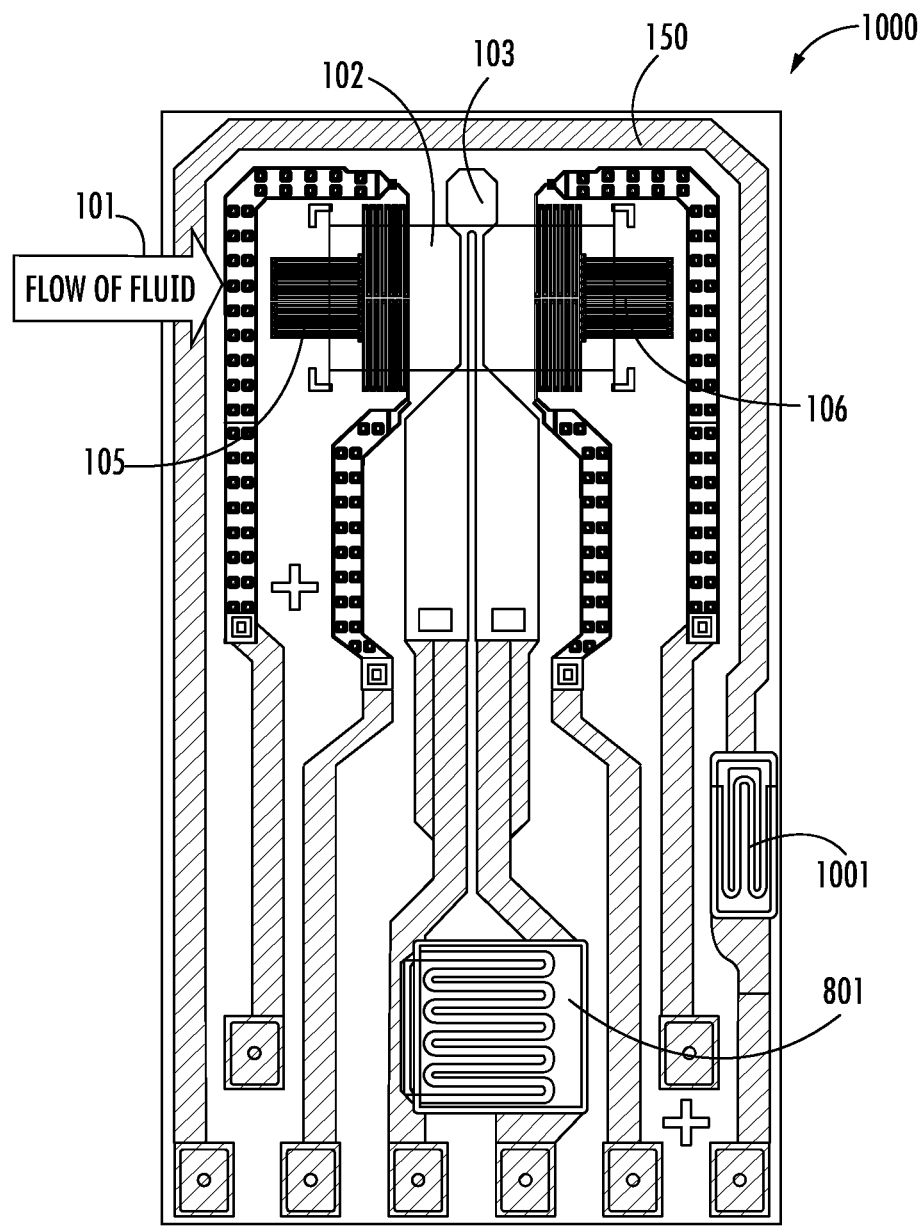
FIG. 10 illustrates a schematic diagram depicting an example layout for an example thermopile-based flow sensing apparatus 1000 in accordance with various embodiments of the present disclosure.

Referring now to FIG. 10, a schematic diagram depicting an example layout for an example thermopile-based flow sensing apparatus 1000 in accordance with various embodiments of the present disclosure is provided.

In some embodiments, the example thermopile-based flow sensing apparatus 1000 may be provided for sensing a flow of fluid 101 (e.g., a flow of a gas or liquid). In some embodiments, the example thermopile-based flow sensing apparatus 1000 may comprise a membrane structure 102 on a bulk silicon die 150, and a heating structure 103 disposed over or otherwise about the membrane structure 102 and configured to heat a heat area of the membrane structure. In some embodiments, the example thermopile-based flow sensing apparatus 1000 may further comprise a first thermopile 105 disposed upstream of the centerline 104a and a second thermopile 106 disposed downstream of the centerline 104a.

In some embodiments, the example thermopile-based flow sensing apparatus 1000 may further comprise a first ESD protection circuit 801. In some embodiments, the first ESD protection circuit 801 may be placed between the heating structure 103 and an electrical power source for the heating structure 103. In some examples, the first ESD protection circuit 801 is electrically connected with the heating structure in parallel, such that the heating structure 103 of the example thermopile-based flow sensing apparatus 1000 may be protected from ESD.

In some embodiments, the first ESD protection circuit 801 may comprise at least one ESD diode. For example, in an instance that an ESD pulse is presented, the at least one ESD diode may break down and create a low impedance pathway which limits peak voltage/current to the heating structure 103 of the example thermopile-based flow sensing apparatus 1000 by diverting the current flow to ground.

In some embodiments, the example thermopile-based flow sensing apparatus 1000 may further comprise a fourth ESD protection circuit 1001. In some embodiments, the fourth ESD protection circuit 1001 may be configured to control and/or measure a temperature of the bulk silicon die 150 off the membrane structure 102. In some embodiments, the fourth ESD protection circuit 1001 may comprise at least one ESD diode.

Referring now to FIG. 11, a schematic diagram depicting cross-sectional views for an example ESD diode in accordance with various embodiments of the present disclosure is provided.

Referring now to FIGS. 12A, 12B, 12C, 12D, 12E, 12F, 12G, 12H, 12I, 12J, 12K, 12L, 12M, 12N, 12O, 12P, 12Q, 12R, 12S, 12T, 12U, 12V, 12W, 12X, 12Y, 12Z, 12AA, and 12BB, schematic diagrams depicting an example process flow for fabricating an example thermopile-based flow sensing apparatus in accordance with some example embodiments are provided.

Figure 12A:
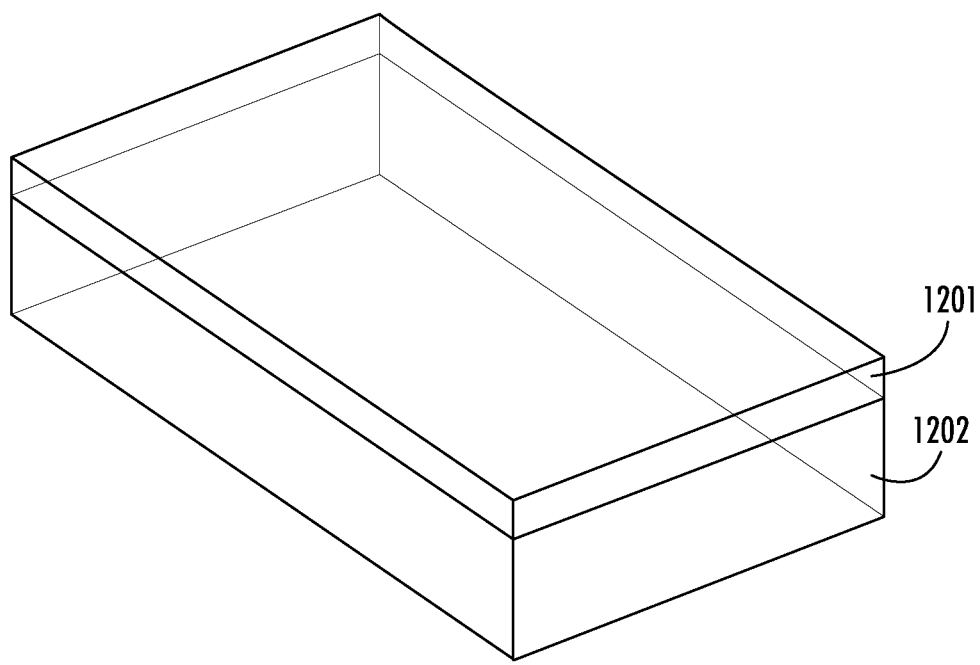

As shown in FIG. 12A, at step 120A, the example process flow may begin with fabricating an N-type epitaxial layer 1201 on a top surface of a substrate 1202 (e.g., a silicon die or wafer).

Figure 12B:
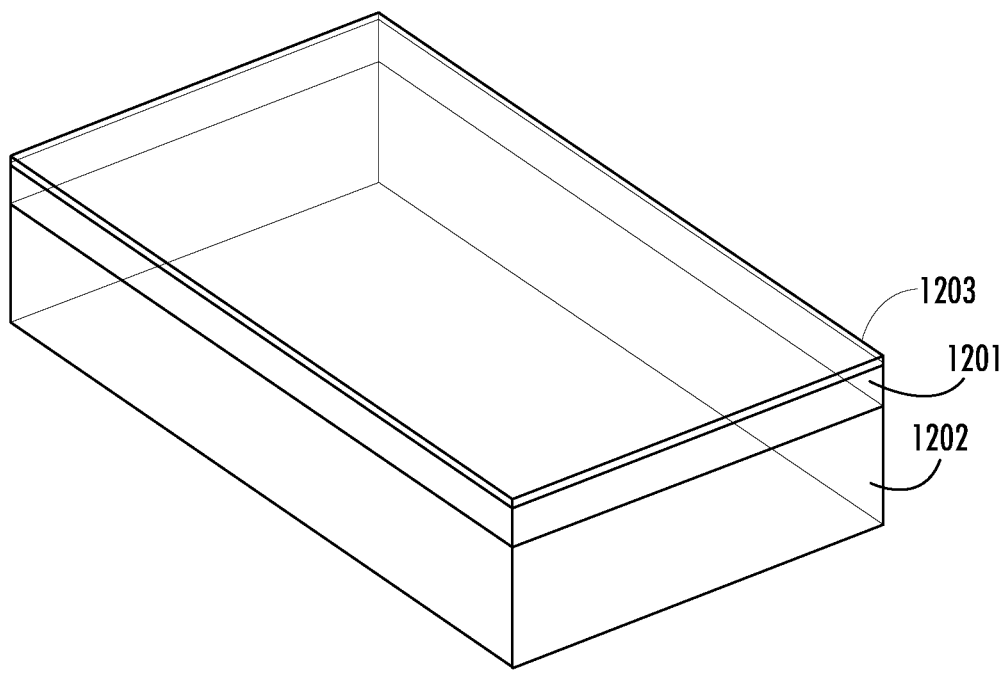

As shown in FIG. 12B, at step 120B, the example process flow may comprise fabricating (e.g., by thermal oxidation) a thermal oxidation layer 1203 on a top surface of the N-type epitaxial layer 1201.

Figure 12C:
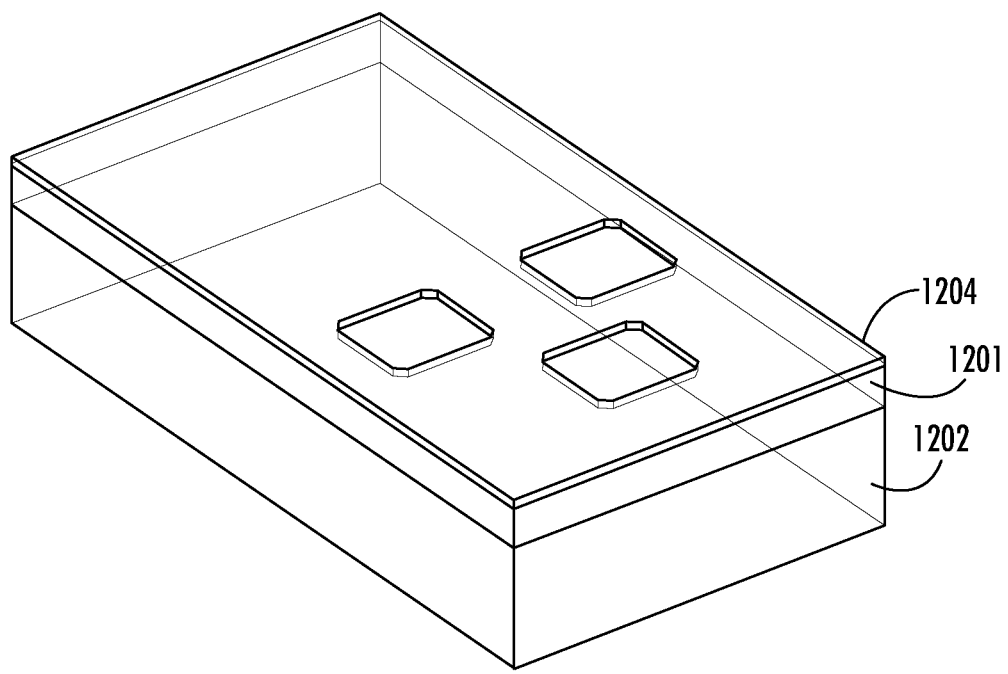

As shown in FIG. 12C, at step 120C, the example process flow may comprise fabricating (e.g., by etching with a mask) a P-well masked layer 1204 by removing a portion of the thermal oxidation layer 1203.

Figure 12D:
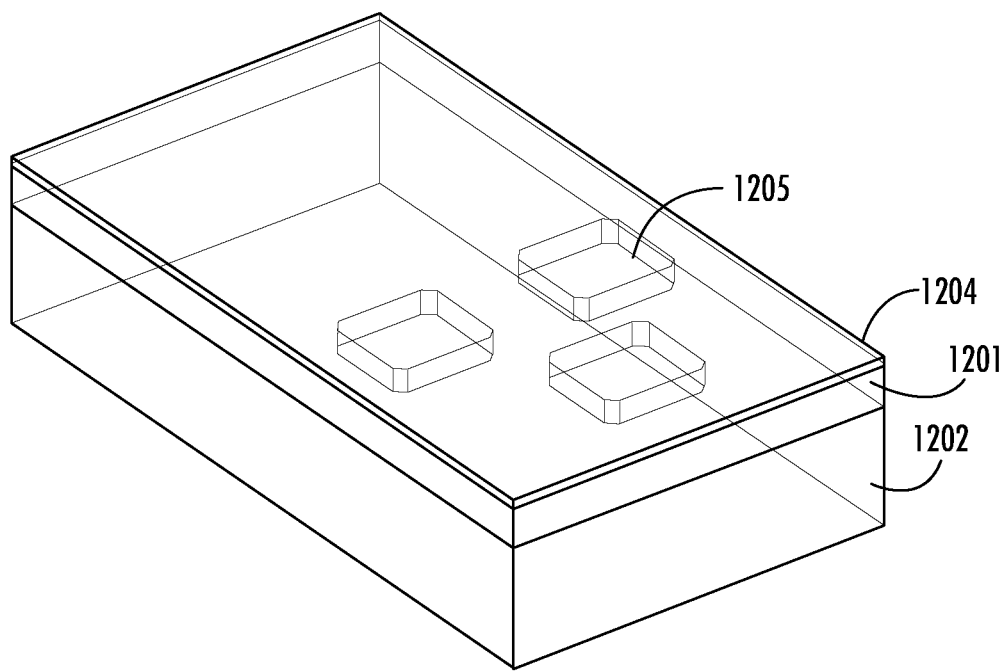

As shown in FIG. 12D, at step 120D, the example process flow may comprise fabricating (e.g., by implantation/diffusion) a P-well implantation/diffusion layer 1205.

Figure 12E:
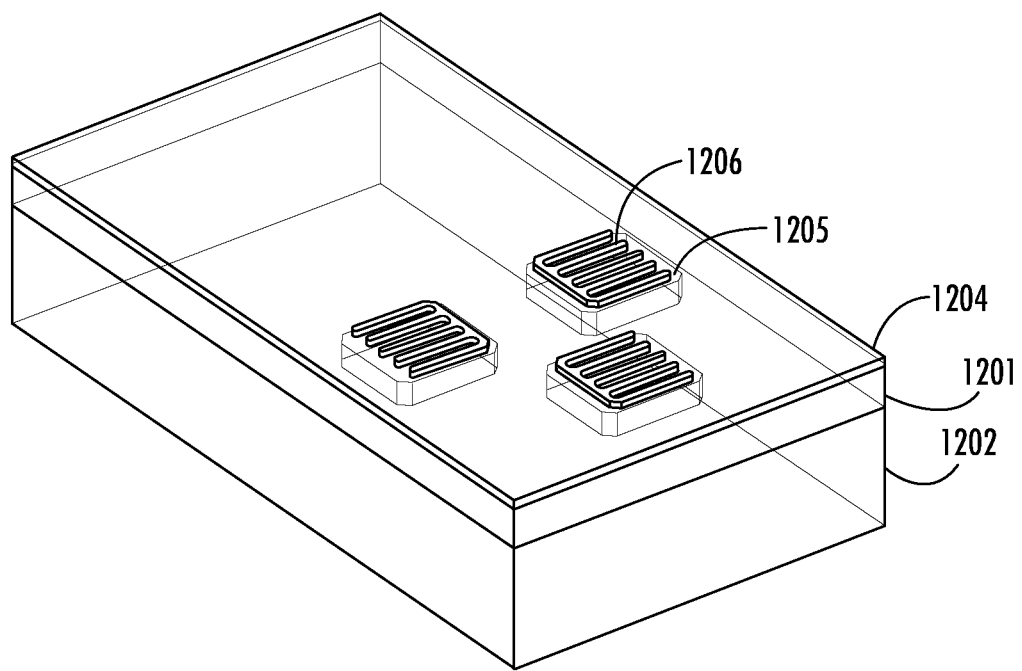

As shown in FIG. 12E, at step 120E, the example process flow may comprise fabricating (e.g., by etching with a mask) an N-plus masked oxidation layer 1206.

Figure 12F:
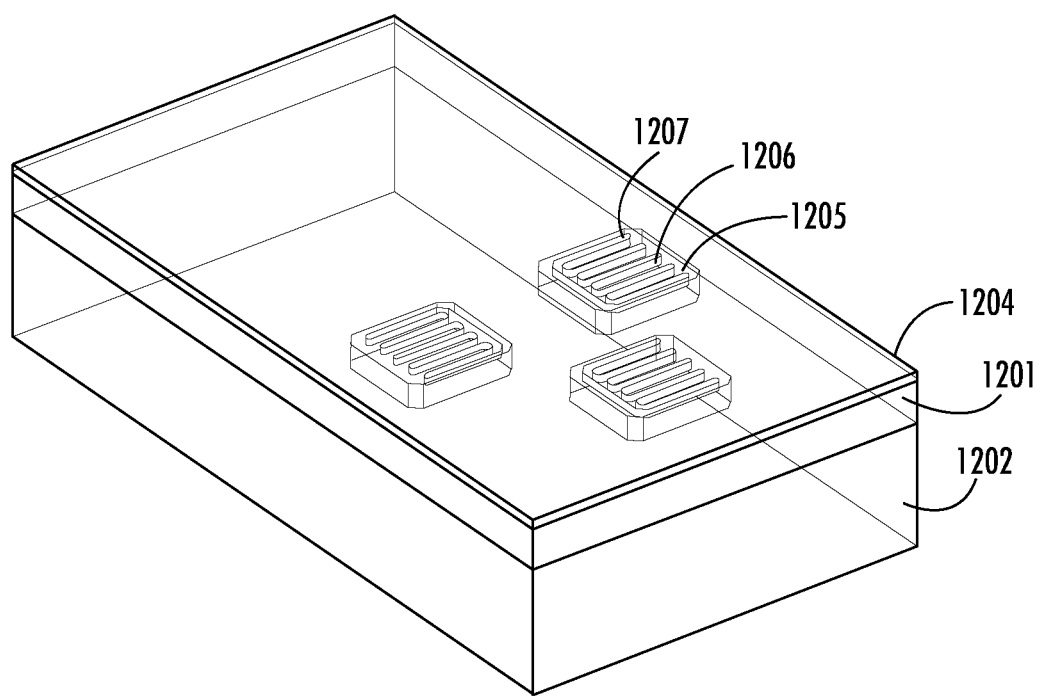

As shown in FIG. 12F, at step 120F, the example process flow may comprise fabricating (e.g., by diffusion) an N-plus POCL3 diffusion layer 1207.

Figure 12G:
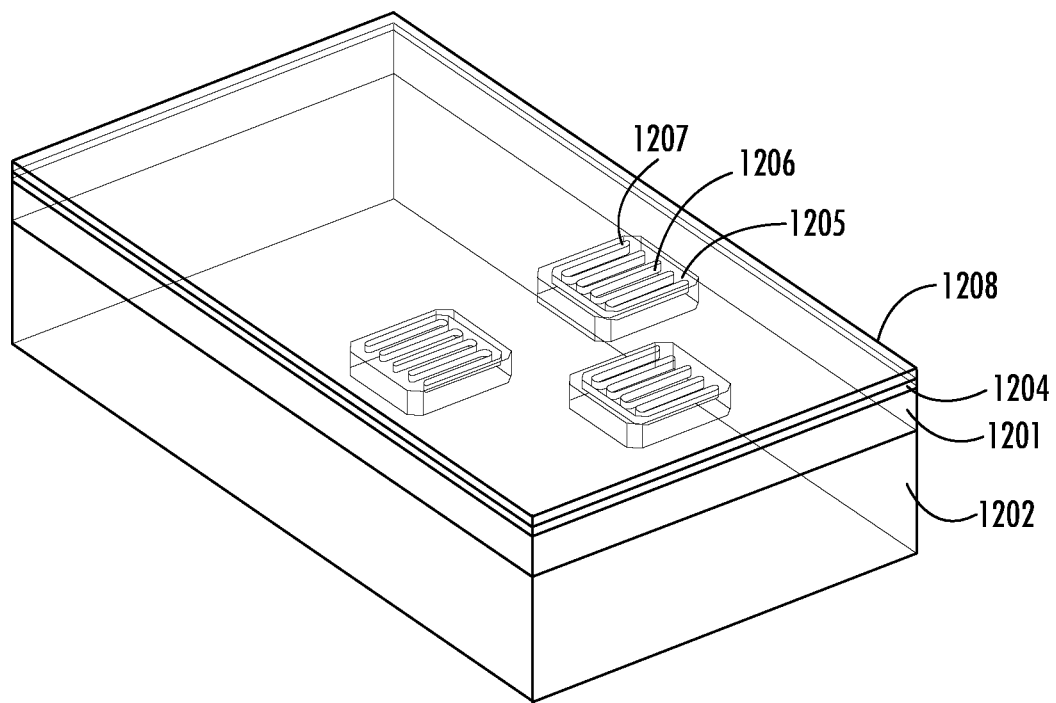

As shown in FIG. 12G, at step 120G, the example process flow may comprise fabricating (e.g., by deposition) a low pressure chemical vapor deposition (LPCVD) nitride layer 1208 on the p-well masked layer 1204.

Figure 12H:
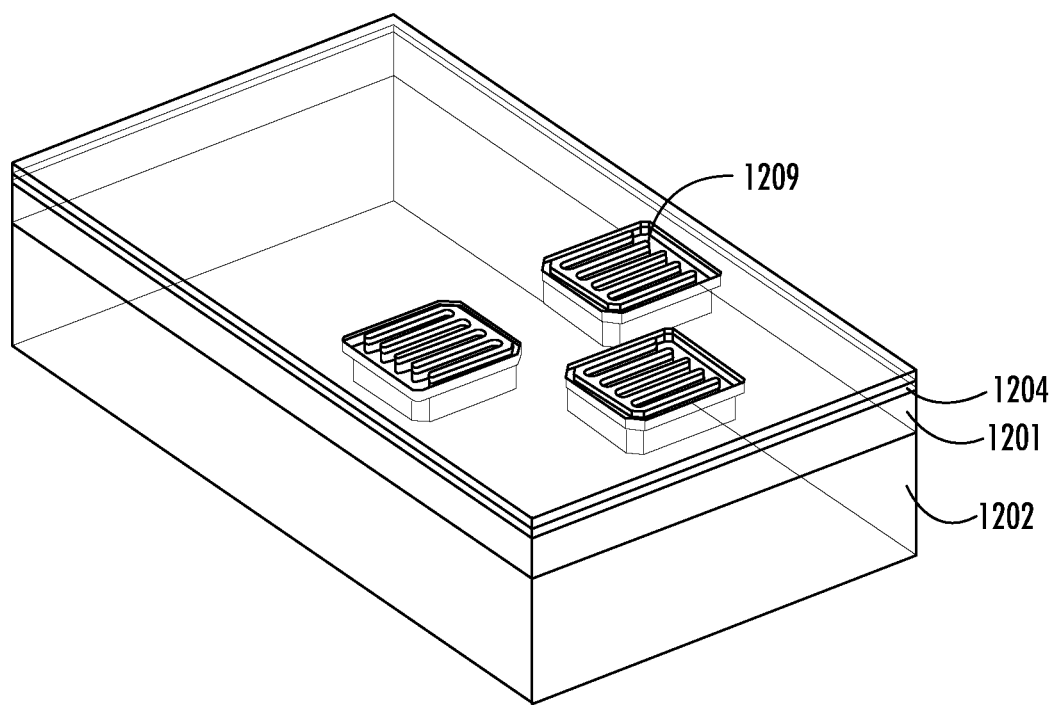

As shown in FIG. 12H, at step 120H, the example process flow may comprise fabricating (e.g., by etching with a mask) the P-plus masked nitride layer 1209 by removing a portion of the LPCVD nitride layer 1208.

Figure 12I:
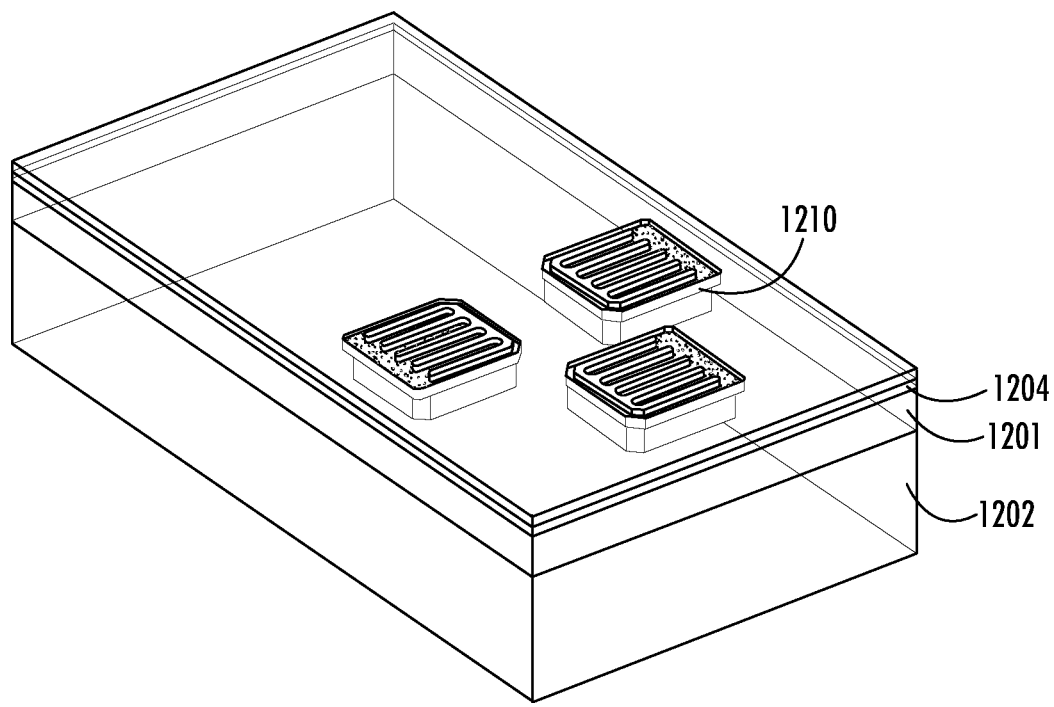

As shown in FIG. 12I, at step 120I, the example process flow may comprise fabricating (e.g., by diffusion) a P-plus BBR3 diffusion layer 1210.

Figure 12J:
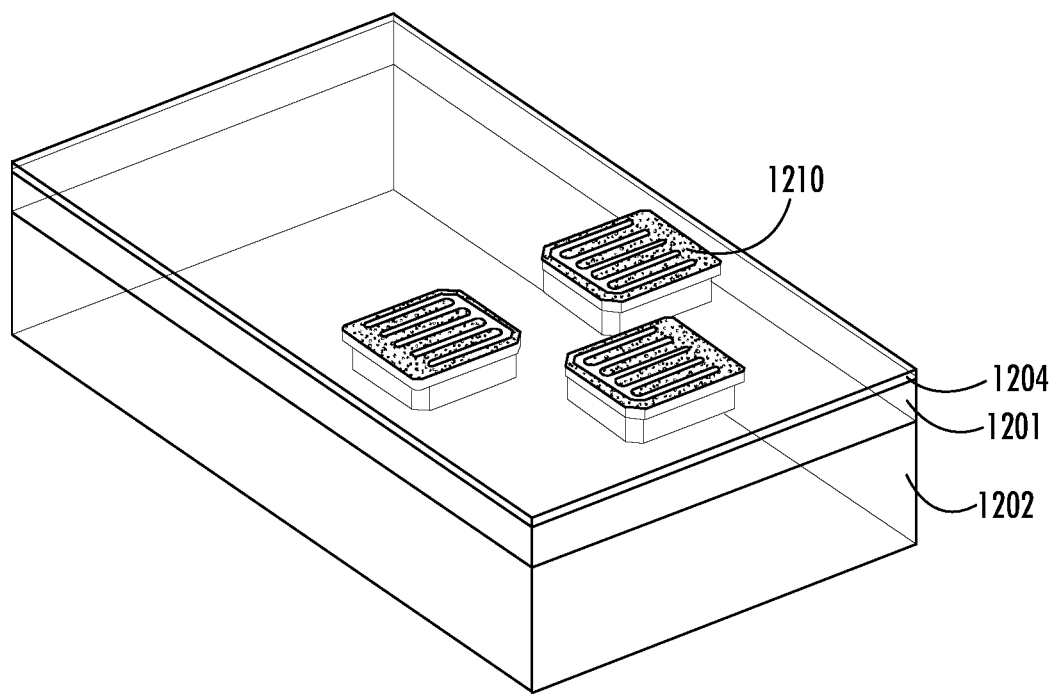

As shown in FIG. 12J, at step 120J, the example process flow may comprise striping the LPCVD nitride layer 1208.

Figure 12K:
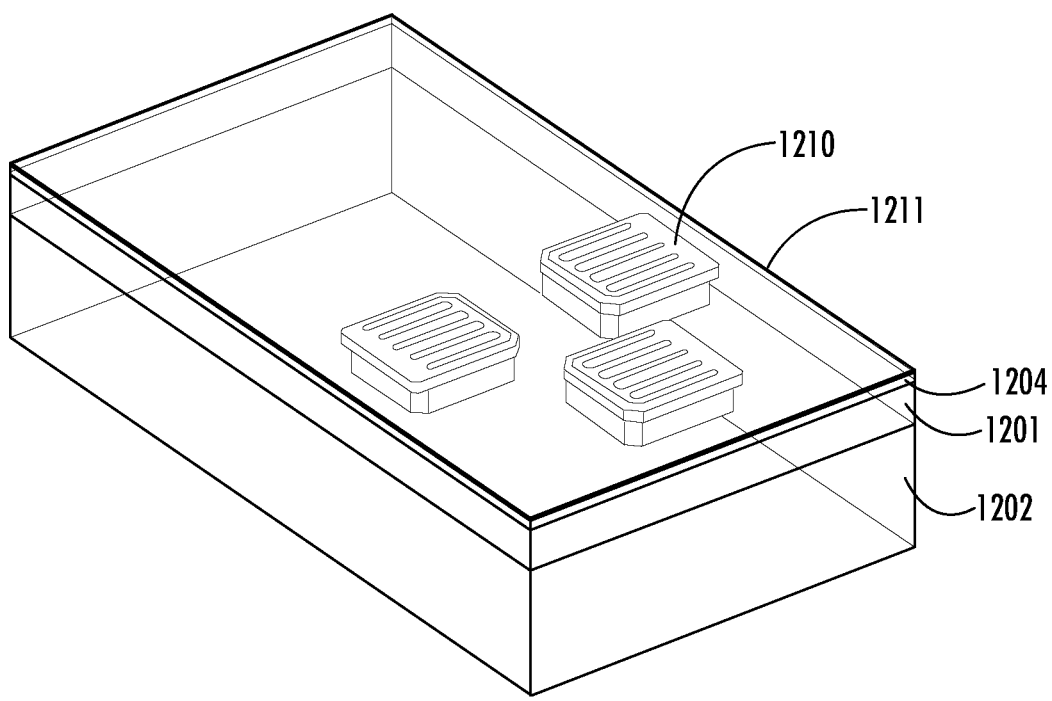

As shown in FIG. 12K, at step 120K, the example process flow may comprise sputtering deposition of a low stress nitride layer 1211.

Figure 12L:
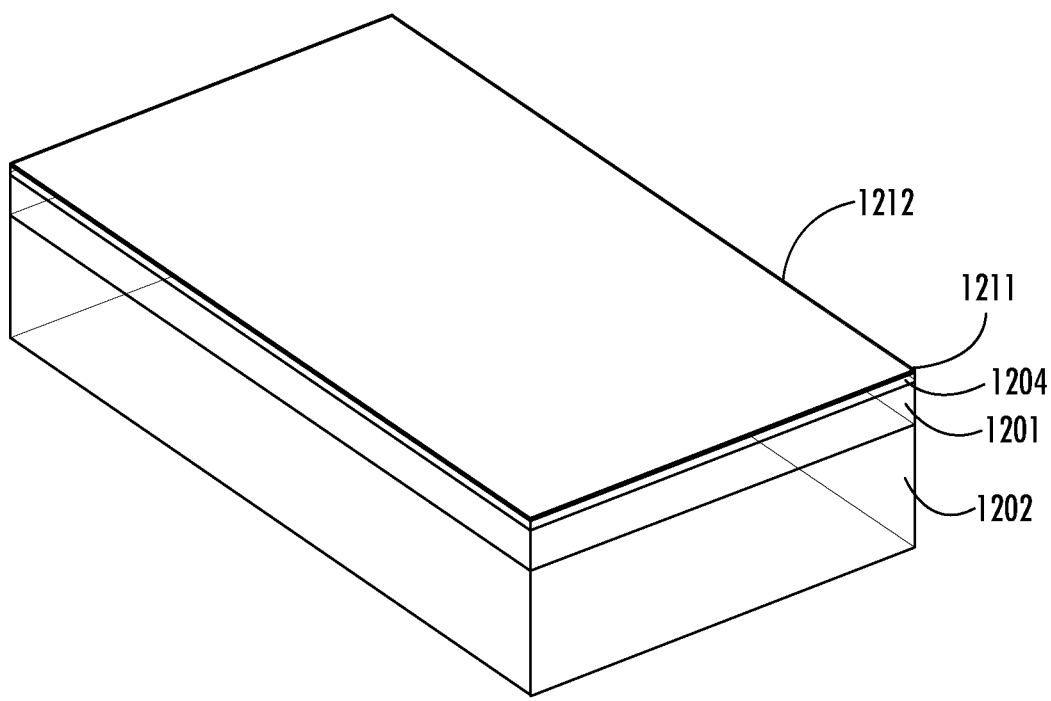

As shown in FIG. 12L, at step 120L, the example process flow may comprise fabricating (e.g., by deposition) a metal film deposition layer 1212 for the heating structure on the low stress nitride layer 1211.

Figure 12M:
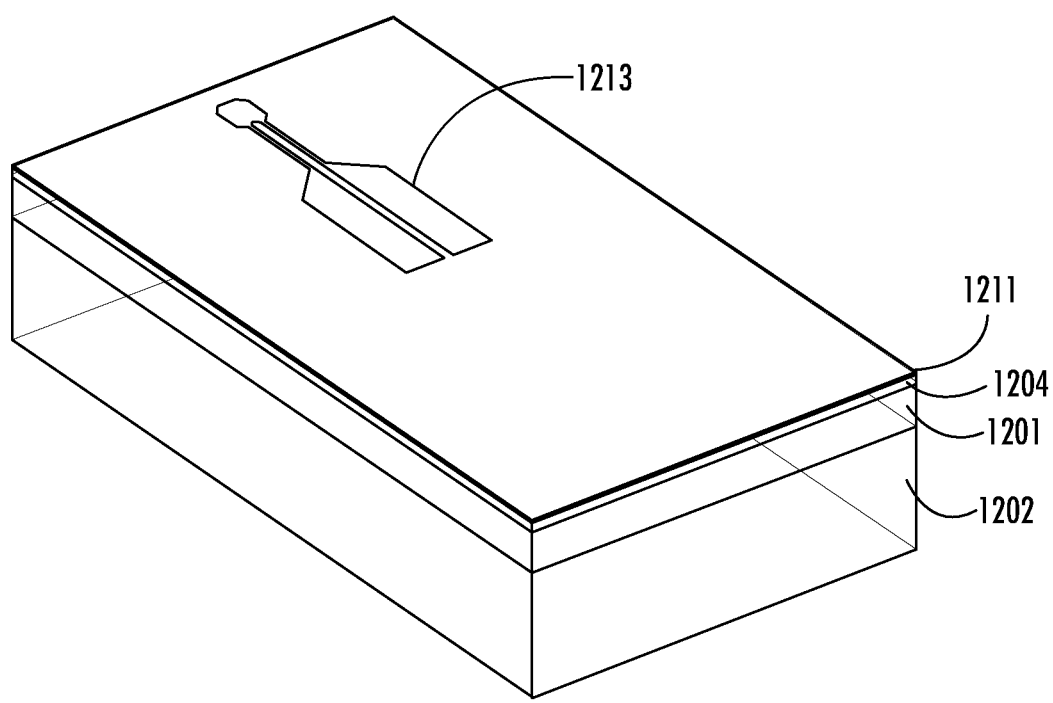

As shown in FIG. 12M, at step 120M, the example process flow may comprise fabricating (e.g., by etching with a mask) a masked definition layer 1213 for the heating structure.

Figure 12N:
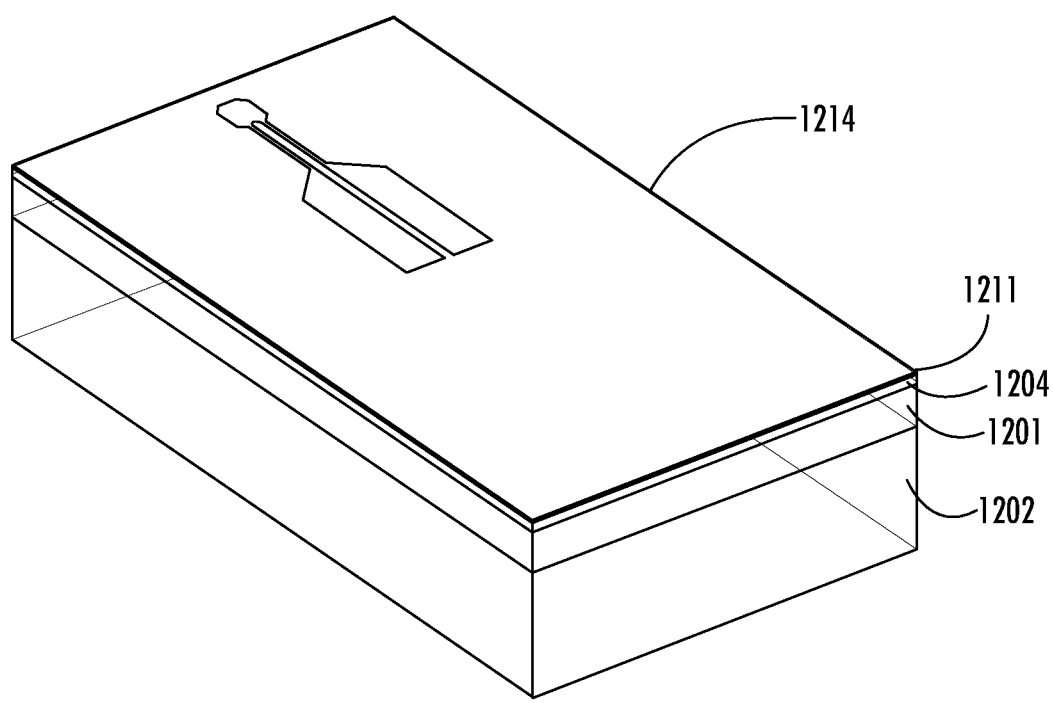
Figure 120:
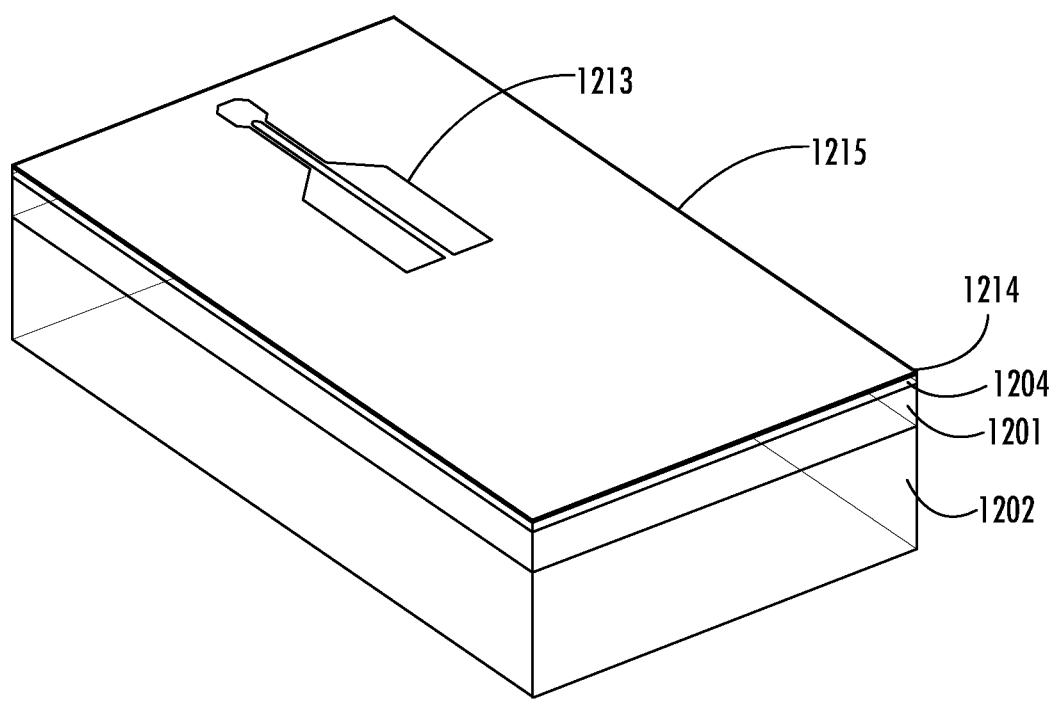

As shown in FIG. 12N, at step 120N, the example process flow may comprise sputtering a low stress nitride layer 1214 on a top surface of the masked definition layer 1213.

As shown in FIG. 12O, at step 120O, the example process flow may comprise fabricating (e.g., by deposition) a first thermopile material layer 1215 on a top surface of the low stress nitride layer 1214.

Figure 12P:
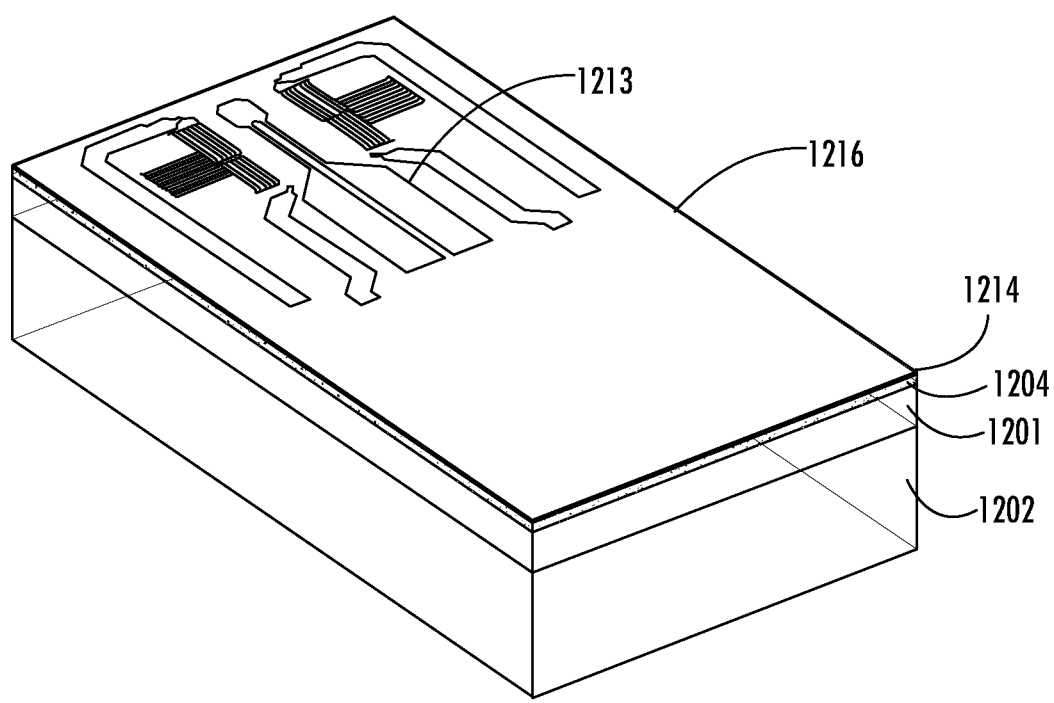

As shown in FIG. 12P, at step 120P, the example process flow may comprise fabricating (e.g., by etching with a mask) a masked first thermopile material layer 1216.

Figure 12Q:
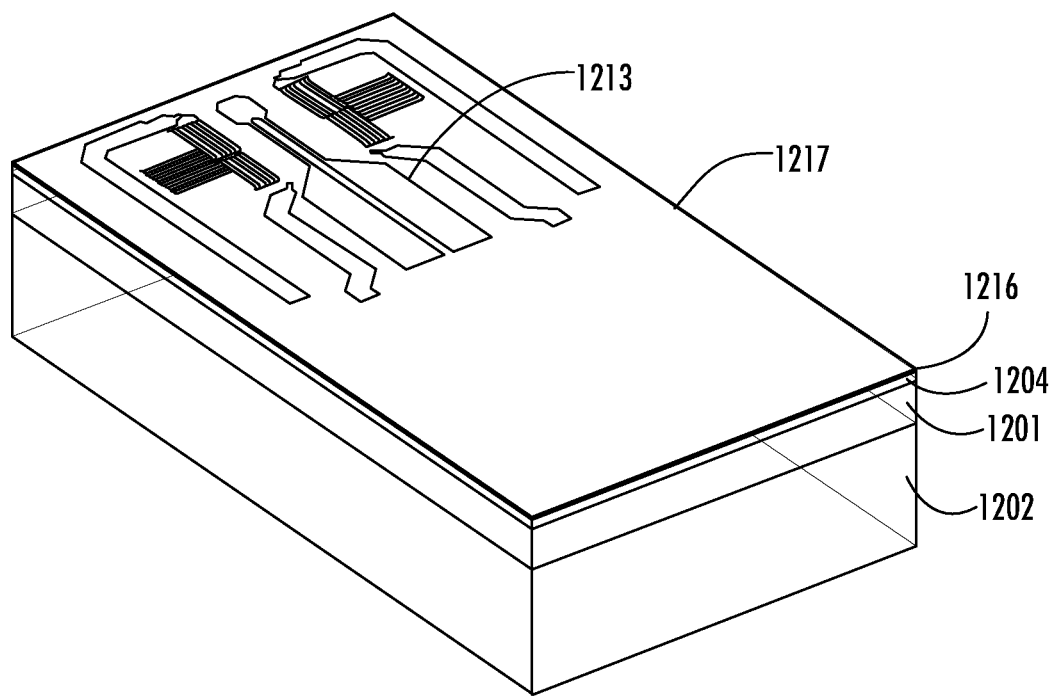

As shown in FIG. 12Q, at step 120Q, the example process flow may comprise sputtering a low stress nitride layer 1217 on a top surface of the masked first thermopile material layer 1216.

Figure 12R:
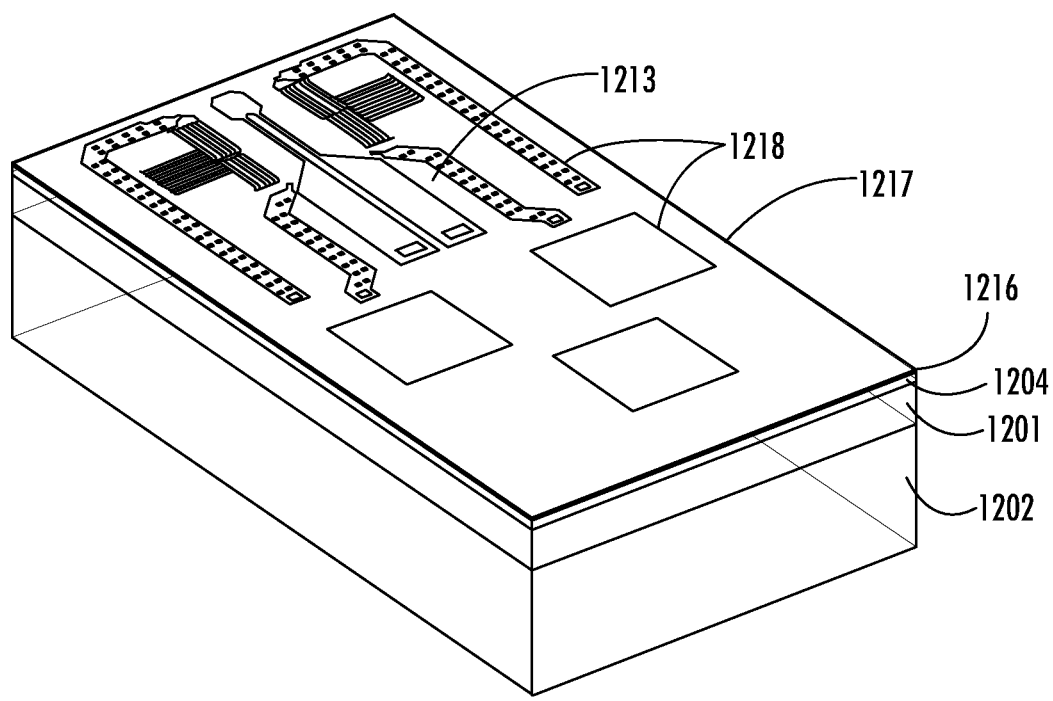

As shown in FIG. 12R, at step 120R, the example process flow may comprise etching masked vias 1218.

Figure 12S:
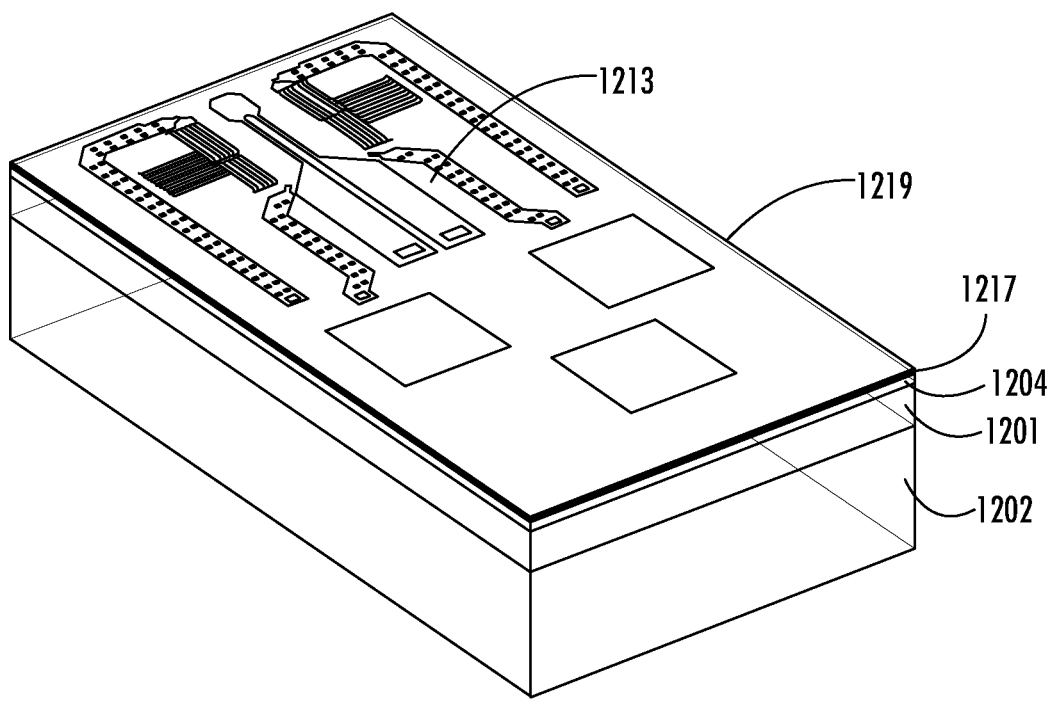

As shown in FIG. 12S, at step 120S, the example process flow may comprise fabricating (e.g., by deposition) a second thermopile material layer 1219 on a top surface of the low stress nitride layer 1217.

Figure 12T:
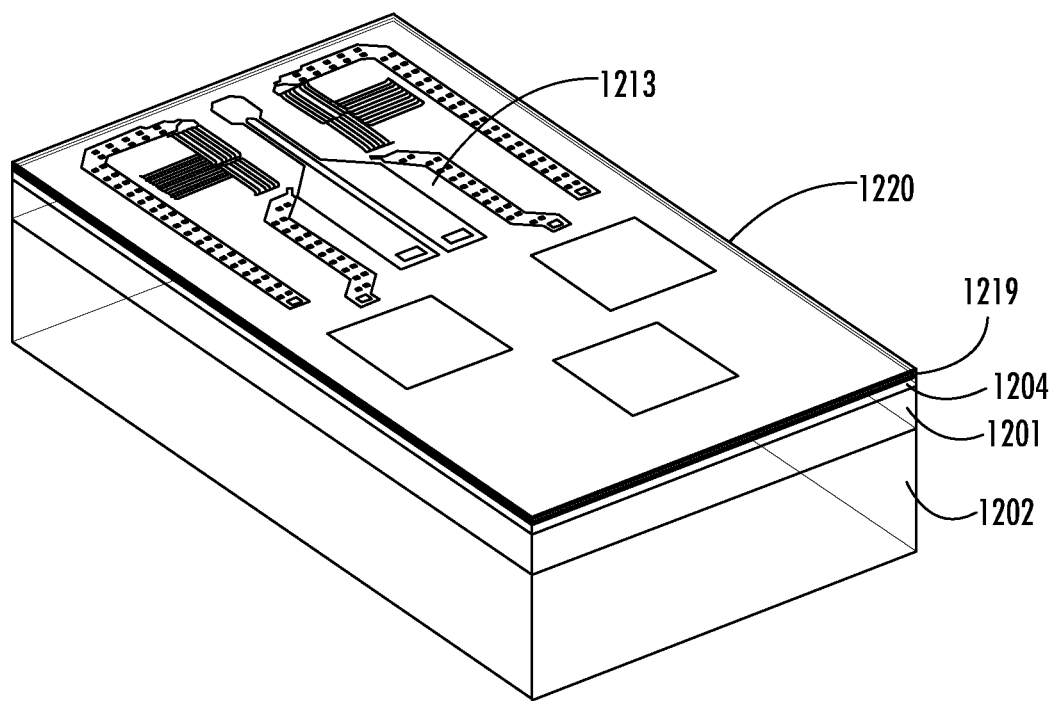

As shown in FIG. 12T, at step 120T, the example process flow may comprise fabricating (e.g., by etching with a mask) a masked second thermopile material layer 1220.

Figure 12U:
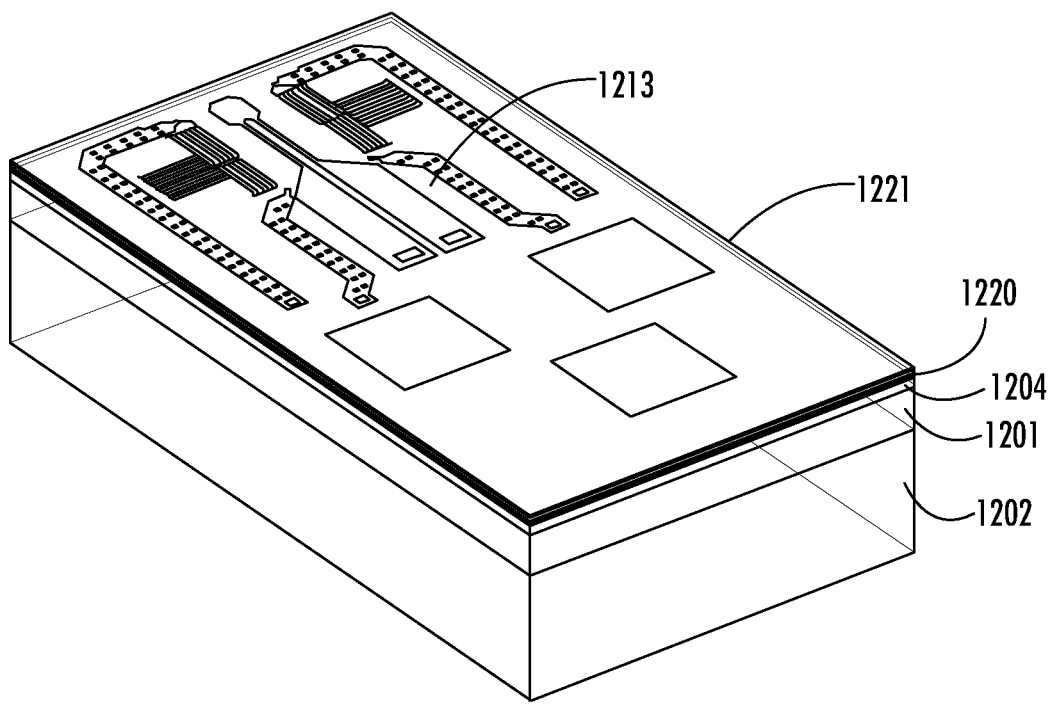

As shown in FIG. 12U, at step 120U, the example process flow may comprise sputtering a low stress nitride layer 1221 on a top surface of the masked second thermopile material layer 1220.

Figure 12V:
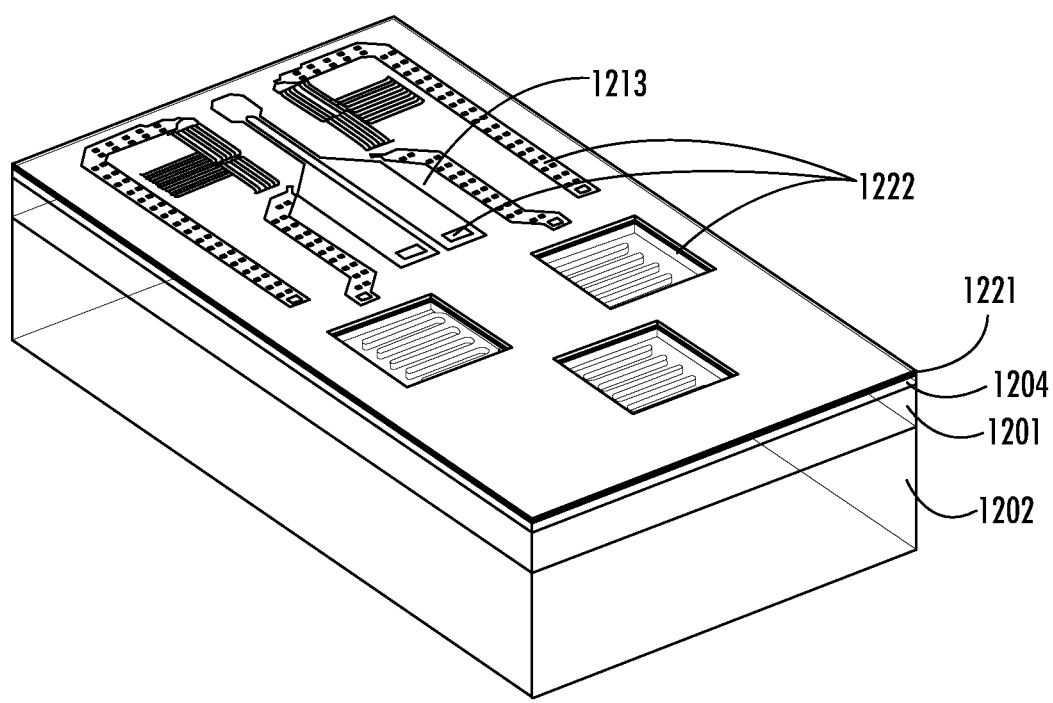

As shown in FIG. 12V, at step 120V, the example process flow may comprise etching the low stress nitride layer 1221 for contacts 1222.

Figure 12W:
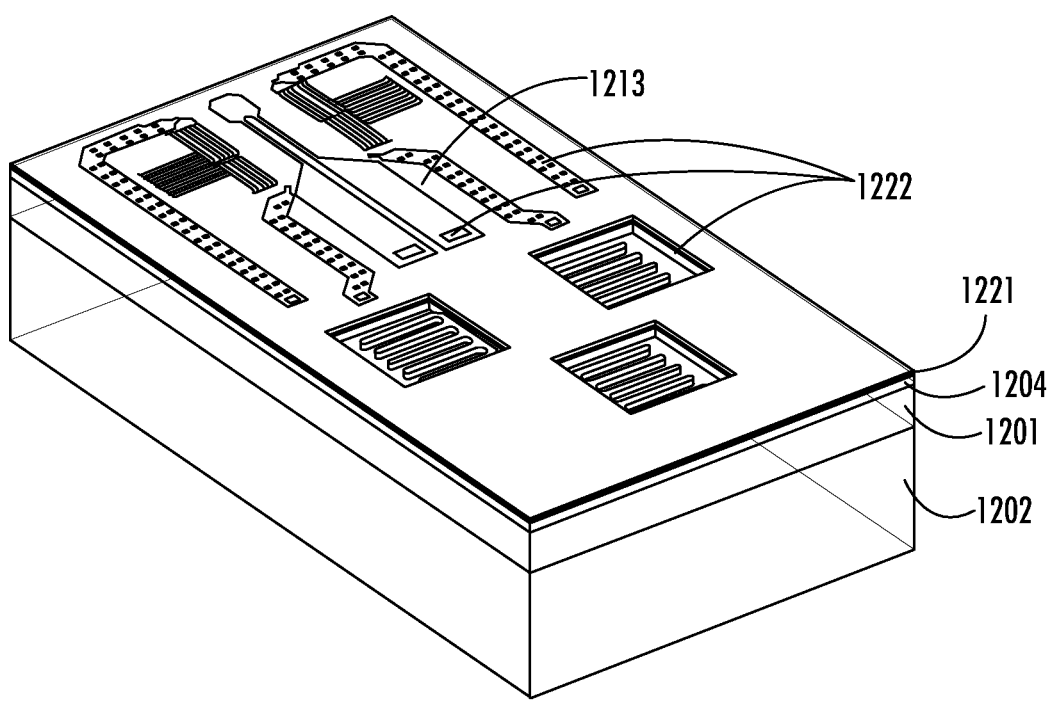

As shown in FIG. 12W, at step 120W, the example process flow may comprise etching the N-plus masked oxidation layer 1206 for contacts 1222.

Figure 12X:
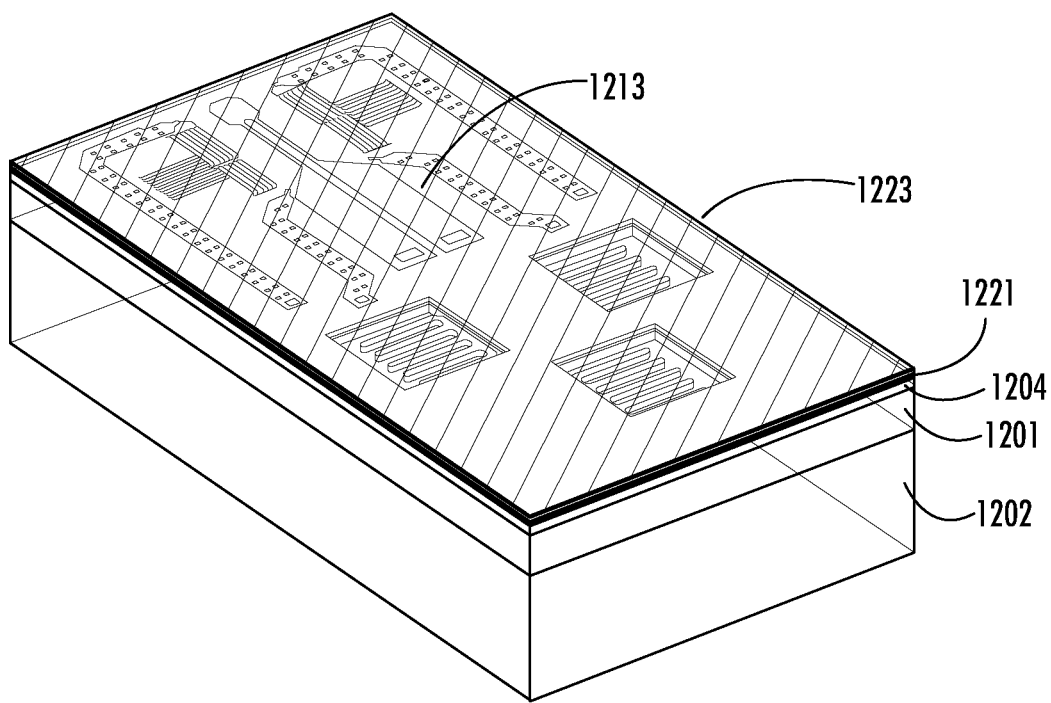

As shown in FIG. 12X, at step 120X, the example process flow may comprise depositing a metal layer 1223 on a top surface of the low stress nitride layer 1221.

Figure 12Y:
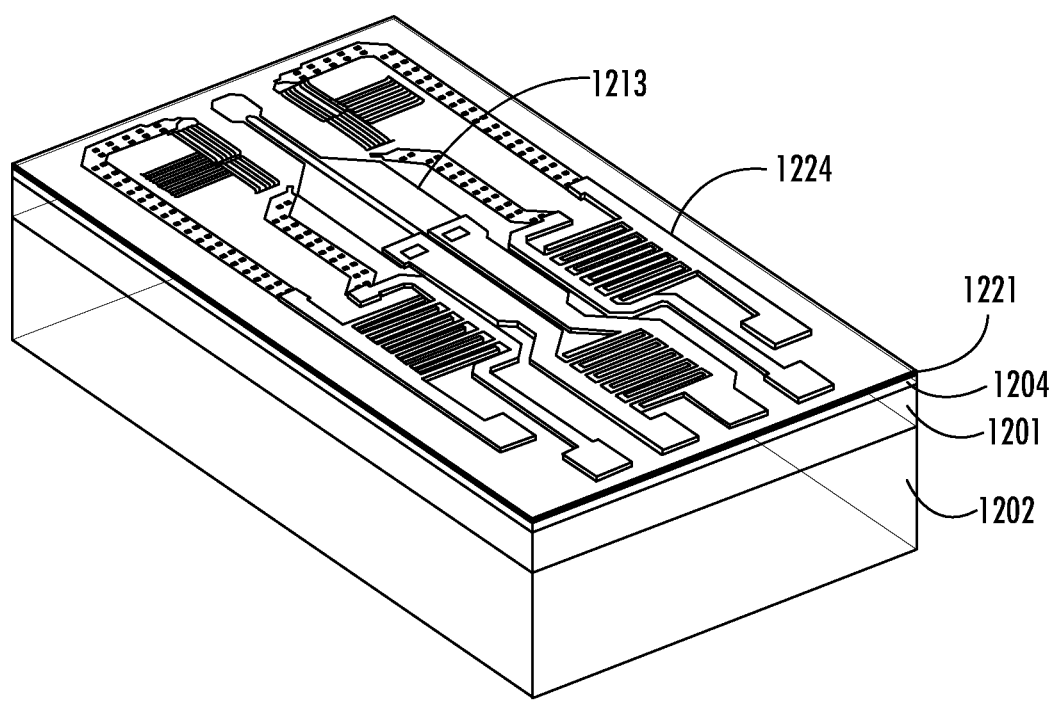

As shown in FIG. 12Y, at step 120Y, the example process flow may comprise fabricating (e.g., by etching with a mask) a masked metal layer 1224.

Figure 12Z:
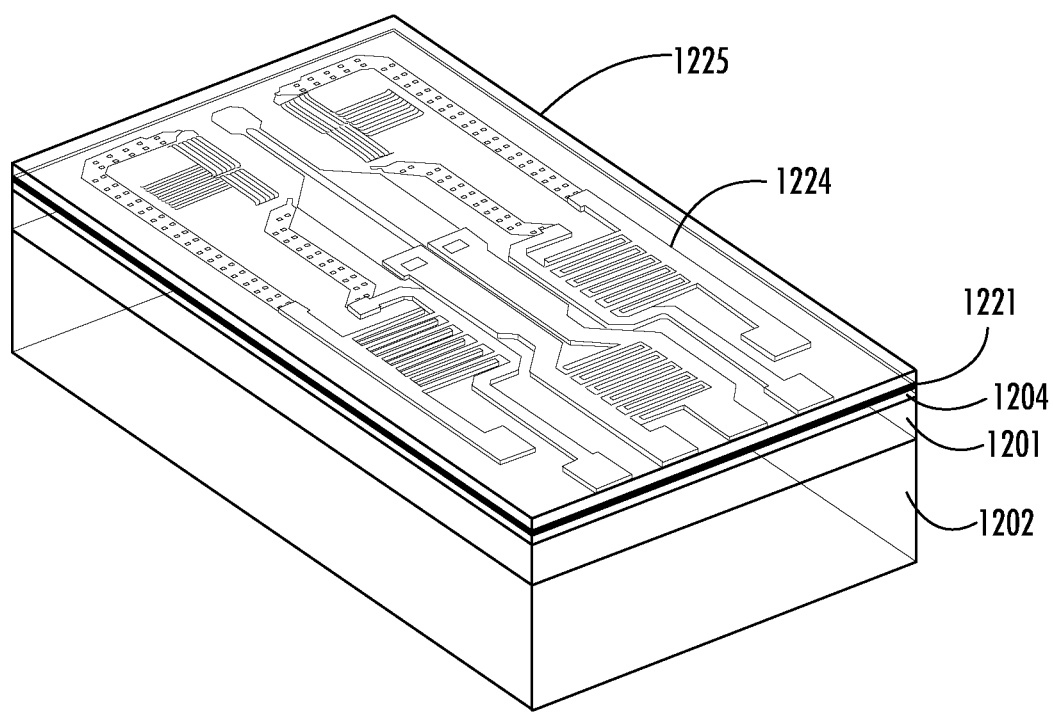
Figure 12A:
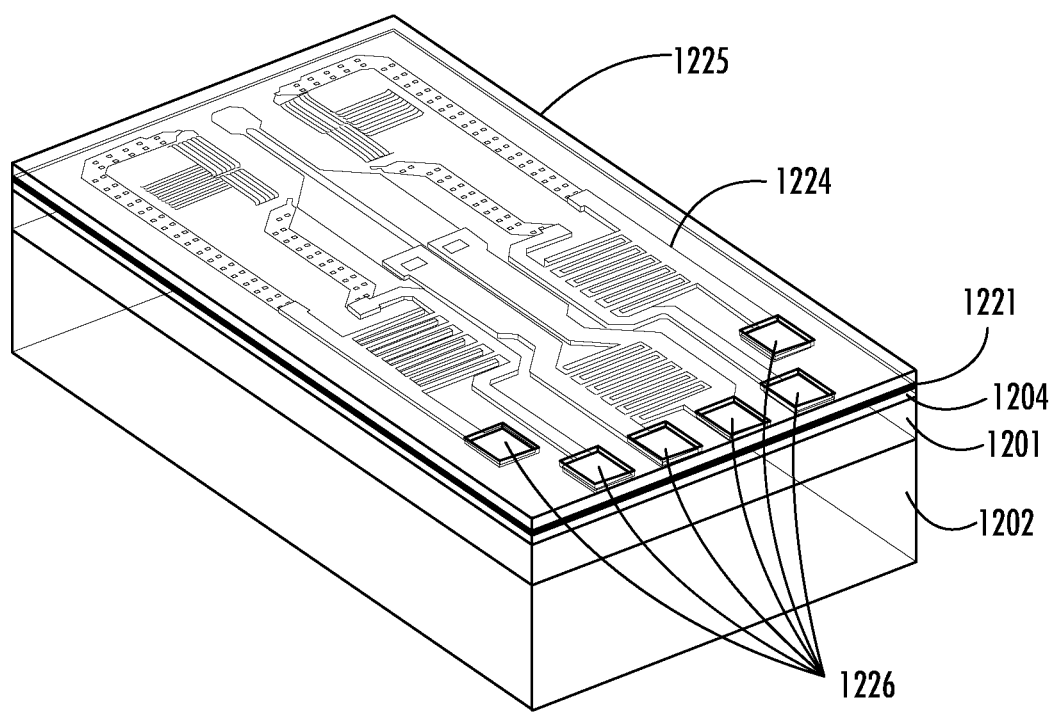
Figure 12A:
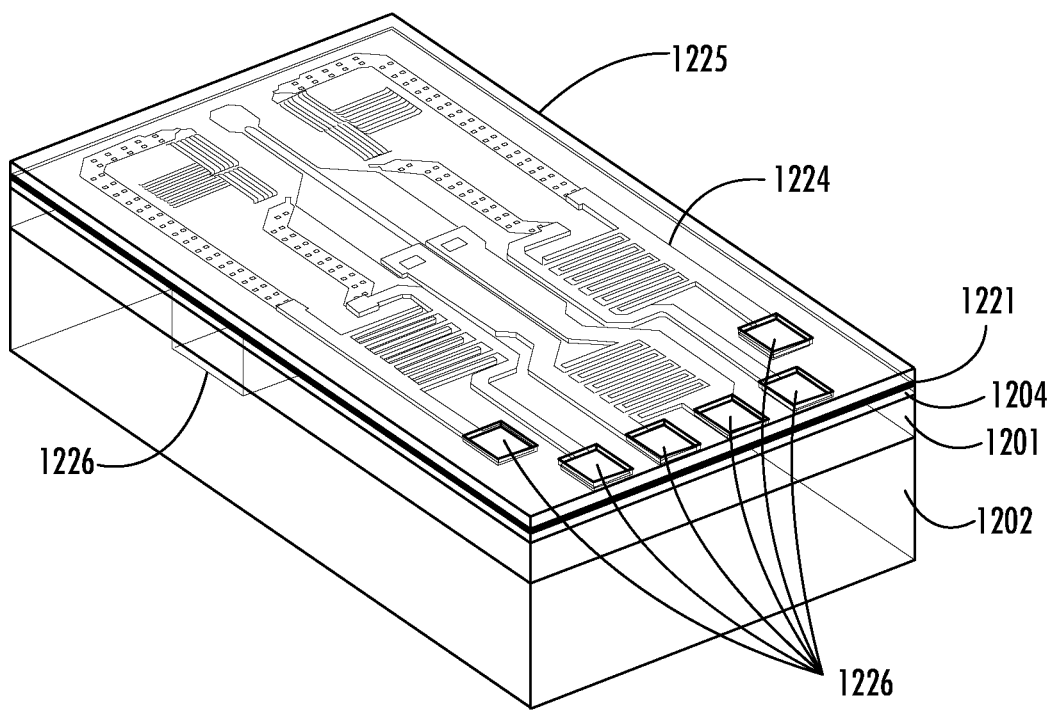

As shown in FIG. 12Z, at step 120Z, the example process flow may comprise fabricating (e.g., by deposition) a plasma-enhanced chemical vapor deposition (PECVD) passivation nitride layer 1225 on the masked metal layer 1224.

As shown in FIG. 12AA, at step 120AA, the example process flow may comprise etching the PECVD passivation nitride layer 1225 to expose bond pads 1226.

As shown in FIG. 12AB, at step 120AB, the example process flow may comprise etching the backside diaphragm 1226 of the substrate 1202 to form the example thermopile-based flow sensing apparatus.

In some embodiments, FIG. 12 thus illustrate the general flow for fabricating the example thermopile-based flow sensing apparatus. In some embodiments, operations from 120A to 120AB may not necessarily occur in the order depicted in FIG. 12.

Figure 13:
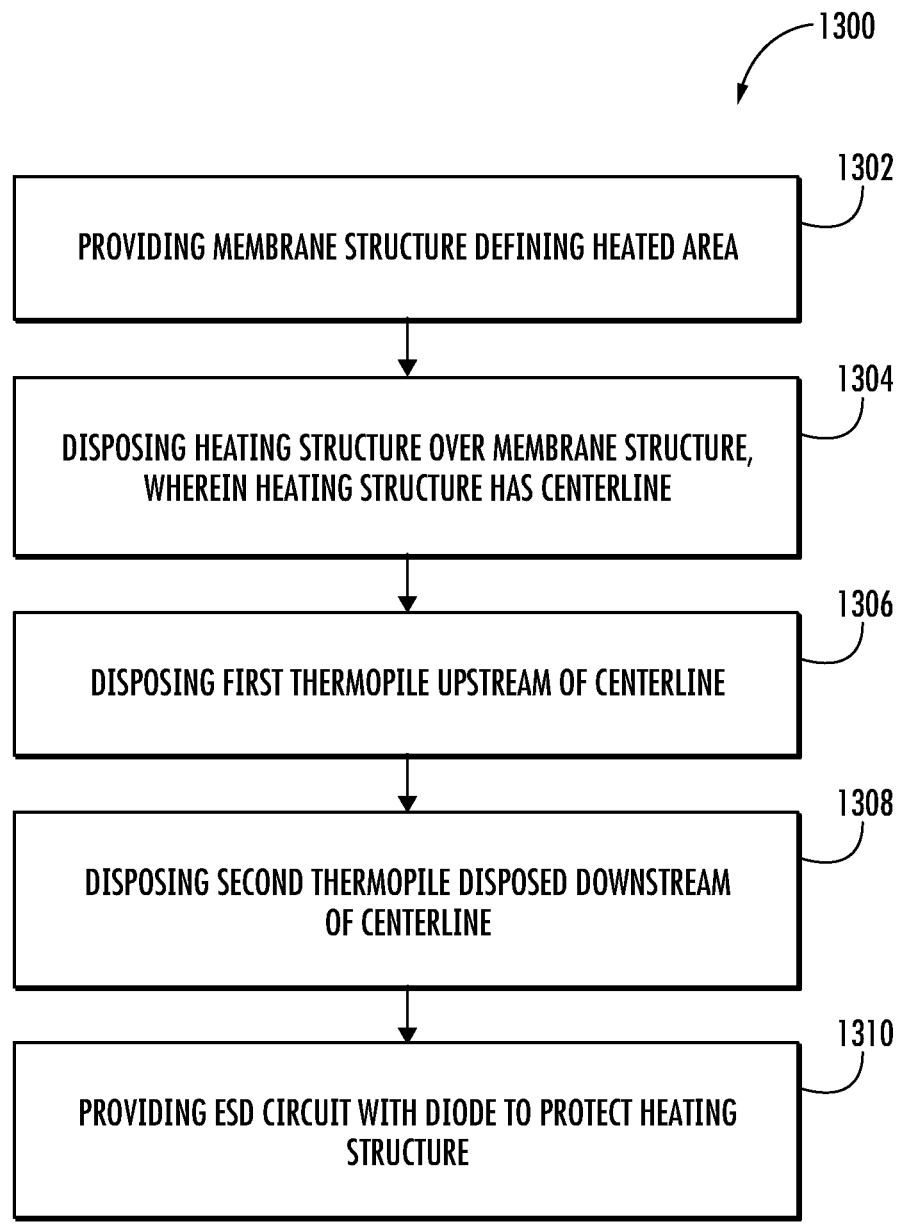
FIG. 13 illustrates an example flowchart diagram depicting an example method for manufacturing or otherwise providing an apparatus for sensing a flow of fluid in accordance with various embodiments of the present disclosure.

Referring now to FIG. 13, an example flowchart diagram illustrating an example method 1300 for manufacturing or otherwise providing an apparatus (e.g., apparatus 100, 400, 700, 800, 900, and 1000) for sensing a flow of fluid according to some example embodiments described herein is provided.

At step/operation 1302 of the example method 1300, a membrane structure defining a heated area is provided. For example, as shown in FIG. 1, a membrane structure 102 is provided to define a heated area 102a on a bulk silicon die 150.

At step/operation 1304 of the example method 1300, a heating structure is disposed over or otherwise about the membrane structure. For example, as shown in FIG. 1, a heating structure 103 with a centerline 104a is disposed over or otherwise about the membrane structure 102.

In some embodiments, referring back to FIG. 1, the heating structure 103 may comprise a heater with curved, rounded, and/or non-sharp corners, such that the current density and the heat produced in the corners may be reduced and any breakdown on the heating structure 103 may be prevented. For example, the heating structure 103 may have a curved corner 401 at a joint between the first portion 103a and 103b of the heating structure 103. Similarly, for example, the heating structure 103 may have a curved corner at a joint between the third portion 103ac and 103b of the heating structure 103. In some examples, the heating structure 103 may have a curved corner 403 at a joint between the first portion 103a and a first external connection to the electrical power source. Similarly, in some examples, the heating structure 103 may have a curved corner at a joint between the third portion 103c and a second external connection to the electrical power source. In additional examples, the heating structure 103 may have a curved edge 402 connecting the first portion 103a and the third portion 103c.

At step/operation 1306 of the example method 1300, a first thermopile is disposed upstream of the centerline. For example, referring back to FIG. 1, a first thermopile 105 is disposed upstream of the centerline 104a.

In some embodiments, the first thermopile 105 may comprise a plurality of first thermocouples 107 and at least a portion of the plurality of first thermocouples 107 are disposed over or otherwise about the membrane structure 102. In some embodiments, each junction of the plurality of first thermocouples 107 has rounded corners.

At step/operation 1308 of the example method 1300, a second thermopile is disposed downstream of the centerline. For example, referring back to FIG. 1, a second thermopile 106 is disposed downstream of the centerline 104a.

In some embodiments, the second thermopile 106 may comprise a plurality of second thermocouples 108 and at least a portion of the plurality of second thermocouples 108 are disposed over or otherwise about the membrane structure 102. In some embodiments, each junction of the plurality of second thermocouples 108 has rounded corners.

At step/operation 1310 of the example method 1300, a first electrostatic discharge (ESD) protection circuit with a diode to protect the heating structure during an ESD pulse is provided. For example, referring back to FIG. 8, a first ESD protection circuit 801 is provided to protect the heating structure 103.

In some embodiments, the first ESD protection circuit 801 may be placed between the heating structure 103 and an electrical power source for the heating structure 103. In some examples, the first ESD protection circuit 801 is electrically connected with the heating structure 103 in parallel, such that the heating structure 103 of the example thermopile-based flow sensing apparatus 800 may be protected from ESD.

In some embodiments, the first ESD protection circuit 801 may comprise at least one ESD diode. For example, in an instance that an ESD pulse is presented, the at least one ESD diode may break down and create a low impedance pathway which limits peak voltage/current to the electric components of the example thermopile-based flow sensing apparatus 800 by diverting the current flow to ground.

In some embodiments, operations 1302, 1304, 1306, 1308, and 1310 may not necessarily occur in the order depicted in FIG. 13. In some embodiments, one or more of the operations depicted in FIG. 13 may occur substantially simultaneously. In some embodiments, one or more additional operations may be involved before, after, or between any of the operations shown in FIG. 13.

FIG. 13 thus illustrate an example flowchart describing operations performed in accordance with example embodiments of the present disclosure. It will be understood that each operation of the flowcharts, and combinations of operations in the flowcharts, may be implemented by various means, such as devices comprising hardware, firmware, one or more processors, and/or circuitry associated with execution of software comprising one or more computer program instructions. In some embodiments, one or more of the procedures described above may be performed by execution of program code instructions. For example, one or more of the procedures described above may be performed by material handling equipment (e.g., a robotic arm, servo motor, motion controllers, and the like) and computer program instructions residing on a non-transitory computer-readable storage memory. In this regard, the program code instructions that, when executed, cause performance of the procedures described above may be stored by a non-transitory computer-readable storage medium (e.g., memory) of a computing apparatus and executed by a processor of the computing apparatus. In this regard, the computer program instructions which embody the procedures described above may be stored by a memory of an apparatus employing an embodiment of the present disclosure and executed by a processor of the apparatus. As will be appreciated, any such computer program instructions may be loaded onto a computer or other programmable apparatus (e.g., hardware) to produce a machine, such that the resulting computer or other programmable apparatus provides for implementation of the functions specified in the method 1300. When executed, the instructions stored in the computer-readable storage memory produce an article of manufacture configured to implement the various functions specified in the method 1300. The program code instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the operations of method 1300. Moreover, execution of a computer or other processing circuitry to perform various functions converts the computer or other processing circuitry into a particular machine configured to perform an example embodiment of the present disclosure.

The flowchart operations described with reference to FIG. 13 support combinations of means for performing the specified functions and combinations of operations for performing the specified functions. It will be understood that one or more operations of the flowcharts, and combinations of operations in the flowcharts, may be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus for sensing a flow of fluid, comprising:
a membrane structure defining a heated area;
a heating structure disposed over the membrane structure and configured to heat the heated area, wherein the heating structure has a centerline;
a plurality of first thermocouples;
a plurality of second thermocouples;
a plurality of third thermocouples;
a plurality of fourth thermocouples;
a plurality of fifth thermocouples;
a plurality of sixth thermocouples;
a first thermopile including the plurality of first thermocouples, the plurality of third thermocouples, and the plurality of fourth thermocouples that are disposed upstream of the centerline, wherein at least a portion of the plurality of first thermocouples are disposed over the membrane structure and at least one junction of the plurality of first thermocouples has rounded corners, wherein a distance between the plurality of third thermocouples and the plurality of first thermocouples ranges from 3 micrometers to 7 micrometers, and wherein a distance between the plurality of third thermocouples and the plurality of fourth thermocouples ranges from 4 micrometers to 8 micrometers; and
a second thermopile including the plurality of second thermocouples, the plurality of fifth thermocouples, and the plurality of sixth thermocouples that are disposed downstream of the centerline, wherein at least a portion of the plurality of second thermocouples are disposed over the membrane structure and at least one junction of the plurality of second thermocouples has rounded corners, wherein a distance between the plurality of fifth thermocouples and the plurality of second thermocouples ranges from 3 micrometers to 7 micrometers, and wherein a distance between the plurality of fifth thermocouples and the plurality of sixth thermocouples ranges from 4 micrometers to 8 micrometers.

2. The apparatus of claim 1, wherein the heating structure comprises a heater with curved corners having a radius of curvature in a range from 20 micrometers to 40 micrometers.

3. The apparatus of claim 1, further comprising an electrostatic discharge (ESD) circuit with a diode to protect the heating structure during an ESD pulse, wherein the ESD circuit is electrically connected with the heating structure in parallel.

4. The apparatus of claim 3, wherein the diode is an ESD diode that breaks down and creates a pathway to divert a current away from the heating structure.

5. The apparatus of claim 1, further comprising an electrostatic discharge (ESD) circuit with a diode to protect the first thermopile during an ESD pulse.

6. The apparatus of claim 5, wherein the diode is an ESD diode that breaks down and creates a pathway to divert a current away from the first thermopile.

7. The apparatus of claim 1, further comprising an electrostatic discharge (ESD) circuit with a diode to protect the second thermopile during an ESD pulse.

8. The apparatus of claim 7, wherein the diode is an ESD diode that breaks down and creates a pathway to divert a current away from the second thermopile.

9. The apparatus of claim 1, further comprising:
at least one thin-film resistor having a width in a range of 1 micrometer to 10 micrometers and configured to measure an ambient temperature out of the heated area.

10. The apparatus of claim 1, further comprising:
a diode configured to measure an ambient temperature out of the heated area.

11. The apparatus of claim 1, wherein:
the plurality of first thermocouples are aligned perpendicular to the centerline, and
the plurality of second thermocouples are aligned perpendicular to the centerline.

12. The apparatus of claim 1, wherein the heating structure has an axis perpendicular to the centerline, wherein the plurality of third thermocouples is disposed upstream of the centerline and on a first side of the axis, wherein the plurality of fourth thermocouples is disposed upstream of the centerline and on a second side of the axis, wherein the plurality of fifth thermocouples is disposed downstream of the centerline and on the first side of the axis, wherein the plurality of sixth thermocouples is disposed downstream of the centerline and on the second side of the axis.

13. The apparatus of claim 1, wherein
each of the plurality of first thermocouples comprises a first interface between a first thermocouple material and a second thermocouple material, and
each of the plurality of second thermocouples comprises a second interface between the first thermocouple material and the second thermocouple material.

14. The apparatus of claim 13, wherein the first thermocouple material comprises n-type polysilicon, and the second thermocouple material comprises p-type polysilicon.

15. The apparatus of claim 13, wherein the first thermocouple material comprises a nickel-iron alloy, and wherein the second thermocouple material comprises chromium, chromium disilicide, or rhenium disilicide.

16. The apparatus of claim 13, wherein the first thermocouple material comprises chromium nitride, and wherein the second thermocouple material comprises copper or aluminum.

17. A method for manufacturing an apparatus for sensing a flow of fluid, comprising:
providing a membrane structure defining a heated area;
disposing a heating structure over the membrane structure, wherein the heating structure has a centerline;
disposing a plurality of first thermocouples, a plurality of second thermocouples, a plurality of third thermocouples, a plurality of fourth thermocouples, a plurality of fifth thermocouples, and a plurality of sixth thermocouples, comprising:
disposing a first thermopile upstream of the centerline, wherein the first thermopile includes the plurality of first thermocouples, the plurality of third thermocouples, and the plurality of fourth thermocouples disposed upstream of the centerline, wherein at least a portion of the plurality of first thermocouples are disposed over the membrane structure, and at least one junction of the plurality of first thermocouples has rounded corners, wherein a distance between the plurality of third thermocouples and the plurality of first thermocouples ranges from 3 micrometers to 7 micrometers, and wherein a distance between the plurality of third thermocouples and the plurality of fourth thermocouples ranges from 4 micrometers to 8 micrometers; and
disposing a second thermopile disposed downstream of the centerline, wherein the second thermopile includes the plurality of second thermocouples, the plurality of fifth thermocouples, and the plurality of sixth thermocouples disposed downstream of the centerline, wherein at least a portion of the plurality of second thermocouples are disposed over the membrane structure, and at least one junction of the plurality of second thermocouples has rounded corners, wherein a distance between the plurality of fifth thermocouples and the plurality of second thermocouples ranges from 3 micrometers to 7 micrometers, and wherein a distance between the plurality of fifth thermocouples and the plurality of sixth thermocouples ranges from 4 micrometers to 8 micrometers.

18. The method of claim 17, wherein the heating structure comprises a heater with curved and non-sharp corners having a radius of curvature in a range from 20 micrometers to 40 micrometers.

19. The method of claim 17, further comprising providing an electrostatic discharge (ESD) circuit with a diode to protect the heating structure during an ESD pulse.

20. The method of claim 19, wherein the diode is an ESD diode that breaks down and creates a pathway to divert a current away from the heating structure, wherein the ESD circuit is electrically connected with the heating structure in parallel.

* * * * *